US011741592B2

(12) United States Patent
Zepeda Salvatierra et al.

(10) Patent No.: US 11,741,592 B2
(45) Date of Patent: Aug. 29, 2023

(54) GENERATION OF TRAINING DATA FROM A SINGLE IMAGE

(71) Applicant: Amazon Technologies, Inc., Seattle, WA (US)

(72) Inventors: Joaquin Zepeda Salvatierra, Mercer Island, WA (US); Anant Patel, Seattle, WA (US); Shaun Ryan James McDowell, Great Neck, NY (US); Prakash Krishnan, Oakland, NJ (US); Ranju Das, Seattle, WA (US); Niels Brouwers, New York, NY (US); Barath Balasubramanian, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 17/106,028

(22) Filed: Nov. 27, 2020

(65) Prior Publication Data

US 2022/0172342 A1    Jun. 2, 2022

(51) Int. Cl.
*G06T 7/00* (2017.01)
*G06T 7/11* (2017.01)
*G06T 7/174* (2017.01)

(52) U.S. Cl.
CPC ............. *G06T 7/0004* (2013.01); *G06T 7/11* (2017.01); *G06T 7/174* (2017.01); *G06T 2207/20081* (2013.01); *G06T 2207/20092* (2013.01); *G06T 2207/30164* (2013.01)

(58) Field of Classification Search
CPC ......... G06T 7/0004; G06T 7/11; G06T 7/174; G06T 2207/20081; G06T 2207/20092; G06T 2207/30164; G06T 2200/24; G06T 2207/10116; G06T 2207/20021; G06T 7/001; G06V 10/70; G06V 20/52; G06V 30/19147

See application file for complete search history.

(56) References Cited

U.S. PATENT DOCUMENTS

| 11,481,683 | B1* | 10/2022 | Singh | G06N 5/04 |
| 11,501,513 | B2* | 11/2022 | Wang | G06T 7/194 |
| 2020/0082296 | A1* | 3/2020 | Fly | G06F 17/18 |
| 2020/0210768 | A1* | 7/2020 | Turkelson | G06V 40/63 |

(Continued)

OTHER PUBLICATIONS

U.S. Appl. No. 17/106,023, Pending.
U.S. Appl. No. 17/106,026, Pending.

*Primary Examiner* — Bobbak Safaipour
(74) *Attorney, Agent, or Firm* — Nicholson De Vos Webster & Elliott LLP

(57) ABSTRACT

Techniques for anomaly detection are described. An exemplary method includes receiving a request to create a training data set from at least one image, the request to include an indication of the at least one image and at least one indication of an operation to perform on the at least one image to generate a plurality of images from the at least one image; creating a training dataset by extracting one or more chunks from a first at least one image according to the request; and receiving one or more requests to train an anomaly detection machine learning model using the created training dataset; and training an anomaly detection machine learning model according to one or more requests using the created training data.

20 Claims, 30 Drawing Sheets

(56) References Cited

U.S. PATENT DOCUMENTS

| | | | | |
|---|---|---|---|---|
| 2020/0351283 | A1* | 11/2020 | Salunke | G06F 18/217 |
| 2020/0410660 | A1* | 12/2020 | Tandia | G06V 10/82 |
| 2021/0279469 | A1* | 9/2021 | Holland | G06F 21/64 |
| 2022/0012625 | A1* | 1/2022 | Ben-Itzhak | G06N 20/00 |
| 2022/0028058 | A1* | 1/2022 | Mohamed | G06V 10/774 |
| 2022/0113533 | A1* | 4/2022 | Amthor | G02B 21/361 |
| 2022/0114398 | A1* | 4/2022 | Amthor | G06V 10/751 |
| 2022/0147743 | A1* | 5/2022 | Roy | G06V 10/82 |
| 2022/0171995 | A1* | 6/2022 | Balasu | G06F 18/2155 |
| 2022/0172100 | A1* | 6/2022 | Balasu | G06V 10/7788 |
| 2022/0415019 | A1* | 12/2022 | Wang | G06V 10/774 |
| 2023/0004654 | A1* | 1/2023 | Jurzak | G06N 20/20 |

* cited by examiner

PROJECTS > CREATE

CREATE PROJECT

PROJECT DETAILS

PROJECT NAME 501

[ NAME ]

CHOOSE PROJECT TYPE 503

(●) IMAGE LEVEL      (○) PIXEL LEVEL

MODEL SELECTION 505

(●) AUTOMATIC      (○) MANUAL

[ SELECTION OF PROBLEM(S) TO SOLVE ]

[ CREATE PROJECT ]

*FIG. 5*

PROJECTS > NAME > DATASET > CREATE DATASET

CREATE DATASET

DATASET CONFIGURATION 600

CONFIGURATION OPTION 601
- ◉ CREATE A SINGLE DATASET
- ◉ CREATE TRAINING AND TEST DATASET

IMAGE SOURCE CONFIGURATION 602

IMPORT IMAGES 603
- ◉ FROM PROVIDER NETWORK STORAGE
- ◉ FROM COMPUTER
- ◉ COPY EXISTING
- ◉ IMPORT

STORAGE LOCATION 605
[PATH]

AUTOMATIC LABELING 607

☑ 📁 IMAGE FOLDER
  📁 ANOMALY
  📁 NORMAL

MULTIPLE IMAGE CREATION OPTION 609
- ◉ GENERATE MULTIPLE IMAGES FROM SINGLE IMAGE

IMAGE LOCATION 611
[PATH]

[CREATE DATASET]

*FIG. 6*

PROJECTS > NAME > MODEL

NAME

MODEL PERFORMANCE METRICS 1101

STATUS 1103  
[ COMPLETE ]

DATE TRAINED 1105  
[ DATE ]

TRAIN DURATION 1107  
[ TIME ]

TEST IMAGES 1109  
[ #, # ANOM ]

SCORE 1111  
[ # ]

PRECISION 1113  
[ % ]

RECALL 1115  
[ % ]

ANOMALY THRESHOLD 1117  
[ 0.05 ]

ADVANCED METRICS 1119

ROC CURVE

TEST RESULTS OVERVIEW 1120

PREDICTED AS NORMAL  
CORRECT #   INCORRECT #

PREDICTED AS ANOMALY  
CORRECT #   INCORRECT #

FILTERS 1121

◉ ALL IMAGES (#)
◉ PREDICTED AS NORMAL (#)
◉ PREDICTED AS ANOMALY (#)

☐ CORRECT (#)
☐ INCORRECT (#)

IMAGES (#) 1131

[ SEARCH          1133 ]     [ SORT IMAGES    1135 ]

| FILE NAME      CORRECT | FILE NAME      INCORRECT | FILE NAME      CORRECT |
|---|---|---|
| PRED. NORM.   SCORE # | PRED. NORM.   SCORE # | PRED. ANOM.   SCORE # |

IMAGE GUI 1141

*FIG. 11*

PROJECTS > NAME > ANOMALIES > DETECT ANOMALIES

DETECT ANOMALIES

DETECTION JOB CONFIGURATION 1201

CHOOSE MODEL 1203

[ NAME ]

IMPORT IMAGES 1205

( ● ) FROM PROVIDER NETWORK STORAGE     ( ● ) FROM COMPUTER ( ● ) FROM EXTERNAL DEVICE(S)

STORAGE LOCATION 1207

[ PATH ]

NOTIFICATION TYPE(S) 1209

( ● ) SMS     ( ● ) EMAIL ( ● ) PHONE CALL     ( ● ) CHAT

[ NOTIFICATION PARTICULARS (PHONE NUMBER, EMAIL ADDRESS, ETC.) ]

[ DETECT ANOMALIES 1211 ]

*FIG. 12*

GENERATION OF TRAINING DATA FROM A SINGLE IMAGE

BACKGROUND

Figuring out if a part has been manufactured correctly, or if machine part is damaged, is vitally important to quality. Today, making this determination usually requires humans inspecting objects like machine parts, equipment, and manufacturing lines either physically or in photos to spot any deviations from what is considered "good" (i.e., anomalies). Human inspection is slow, and errors often get missed due to inconsistency in judgment, limited experience and training, availability and cost of labor, and even factors like poor eyesight and being distracted while working. In the manufacturing industry alone, production line shutdowns due to overlooked errors result in millions of dollars of cost overruns and lost revenue every year.

BRIEF DESCRIPTION OF DRAWINGS

Various embodiments in accordance with the present disclosure will be described with reference to the drawings, in which:

FIG. 5 illustrates embodiments of a GUI for the creation of an anomaly detection project.

FIG. 6 illustrates embodiments of a GUI for the creation of a dataset.

FIG. 11 illustrates embodiments of a GUI showing the details of a trained model.

FIG. 12 illustrates embodiments of a GUI for configuring usage of a model to perform anomaly detection.

DETAILED DESCRIPTION

Figure 1:
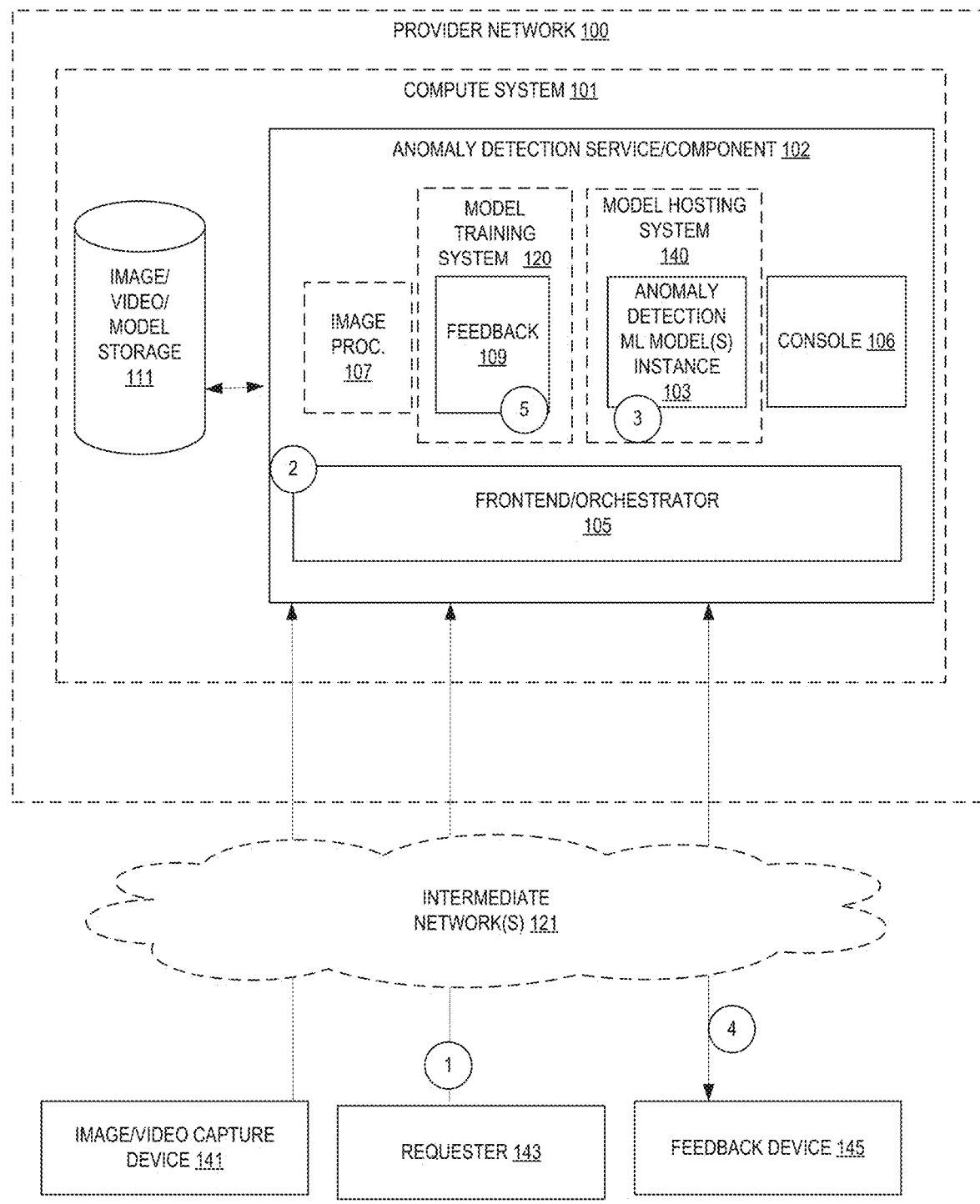
FIG. 1 illustrates embodiments of an anomaly detection service or component.

The present disclosure relates to methods, apparatus, systems, and non-transitory computer-readable storage media for performing anomaly detection, feedback-based training, and/or feedback-based anomaly detection are described. In some embodiments, one or more cameras are installed at a remote site (such as a production line) and their captured images and their metadata (such as a timestamp and camera identifier) are sent to a provider network for anomaly detection.

Figuring out if a part has been manufactured correctly, or if machine part is damaged, is vitally important to quality. Today, making this determination usually requires humans inspecting objects like machine parts, equipment, and manufacturing lines either physically or in photos to spot any deviations from what is considered "good" (i.e., anomalies). Human inspection is slow, and errors often get missed due to inconsistency in judgment, limited experience and training, availability and cost of labor, and even factors like poor eyesight and being distracted while working. In the manufacturing industry alone, production line shutdowns due to overlooked errors result in millions of dollars of cost overruns and lost revenue every year.

To overcome the issues with manual inspection, some companies have applied automated image analysis—a technology known as machine vision—to detect anomalies. These expensive, purpose-built systems of cameras and computers must be calibrated for lighting and perspective with hard-coded rules about what is and isn't a defect to support a single, specialized task and environment. While useful, these systems are very difficult and expensive to maintain. Humans have a natural flexibility that allows us to understand that differences in perspective or lighting are not differences in the object itself. But machine vision systems can't adapt to new information and environmental changes like a human can, so the rules-engine grows into a tangled web of hard-coded exceptions over time, and small changes to the environment require constant recalibration.

Detailed herein are embodiments of methods, etc. for detecting differences in images of objects. As detailed, simple APIs (or GUIs) can be used to a set of baseline "good" images of the object(s) of interest and using feedback on a model trained from those good images improve the original model. In some embodiments, the training data can include of images with defects with a mark over the location of the defects they want to identify (e.g. location of stains on cans) and/or a specified region where the defects are expected (such as expected location of machine parts). A custom machine learning (ML) model is generated to compare subsequent images to the baseline and through that comparison, identifies further defects (e.g. more stains on the cans or missing machine parts). Additionally, feedback on the ML model's predictions (e.g. images which are incorrectly marked abnormal, or mark regions in the image where defects are not identified) may be used to improve the model accuracy, thereby learning from human expertise and getting better over time. Note that images may be 2-D, 3-D, color, black and white, greyscale, etc.

FIG. 1 illustrates embodiments of an anomaly detection service or component. In particular, FIG. 1 illustrates an anomaly detection service (for example, provided as a part of a provider network 100) or component 102 (for example, provided as one or more software components outside of a provider network such as an edge server, edge device, etc., but generically called compute system 101) and entities that may communicate with the anomaly detection service/component 102.

In some embodiments, the anomaly detection service/component 102 analyzes images t (either in full or chunks thereof) for potential anomalies using instances of one or more anomaly detection machine learning (ML) models 103. In some embodiments, a model graph structure is used to configure the anomaly detection. Examples of models 103 used by the anomaly detection service/component 102 may include, but are not limited to models to perform anomaly detection, object detection, and/or alignment (orientation) detection. Note that alignment may be in 2-D or 3-D.

Exemplary use cases include, but are not limited to detecting texture anomalies (examples include analysis of wood finishes, flooring, wall coverings and fabric), spot-the-difference (e.g., a given test image is then compared to a reference set, and the system should either respond with a pixel level (soft) binary mask indicating anomalous regions, or with an image level anomaly score), relative placement (e.g., given a test image, the system responds with the homography mapping each part to its canonical position), object analysis (e.g., where each item needs to satisfy some normalcy criteria specified by means of a large reference set of items and anomalies could include shape, color, and/or texture anomalies), and/or manifest verification (e.g., to ensure that all the items in the box specified in the product's part manifest). As such, at least the detection of visual defects, alignment defects, and placement defects are possible.

Local object analysis may produce a pixel-level anomaly score mask for each object analyzed. In some embodiments, users require mapping the pixel-level anomaly score mask produced by this method to an image-level anomaly score and this is supported by means of a user-provided object mask drawn on a reference object that is transferred to test objects by aligning them to the reference sample. An image-level anomaly score can then be obtained by summing the pixel-level anomaly scores over the support of the object mask. Global object analysis may produce an image-level anomaly score for each object analyzed. Texture analysis may produce a pixel-level mask of anomalies that can be likewise pooled to a global or local anomaly score. Relative placement and shape analysis may produce an output that is one homography $H_i$ per object part i. Manifest verification may produce a count of each object and support high-speed requirements with potentially large numbers of objects, but focusing on situations with strong priors (e.g., simple objects with low intra-class variability, nearly fixed scale, and required invariance to very specific variations like breakage).

The ML models are typically trained using a feedback training module 109 which is detailed below. Feedback allows for a user to provide corrections to predictions, etc. The ML models, images to perform inference on, training dataset(s), and/or testing dataset(s) are stored in storage 111.

A console 106 provides one or more graphical user interfaces (GUIs) to assist a user in configuring the anomaly detection service/component 102, performing anomaly detection, training the anomaly detection ML model(s) 103, etc.

A frontend/orchestrator 105 receives input from users (e.g., requester 143, feedback device 145, etc.) and/or image/video captures device 141, and provides the input to the proper component. Additionally, the frontend/orchestrator 105 orchestrates the various methods detailed herein.

The image/video capture device 141 captures still or video images to be analyzed for anomalies. Exemplary image/video capture devices include, but are not limited to: still cameras, video cameras, smart phones, x-ray machines, scanning electron microscopes, infrared cameras (short-wavelength, mid-wavelength, and long-wavelength), thermal cameras, etc.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 121 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In some embodiments, the provider network 100 includes a model training system 120 that may be used to perform the training and retraining and/or a model hosting system 140 to host trained (and retrained) models.

Circles with numbers in them indicate an exemplary high-level flow. At circle 1, a requester 143 requests that the anomaly detection service/component 102 be configured to perform anomaly detection on unlabeled images from the image/video capture device 141.

At circle 2, a training dataset and testing dataset is generated and stored in storage 111. At circle 3, an initial training of the models 103 is performed using the training dataset and unlabeled data from the testing dataset is subjected to the trained models 103. At circle 4, a request is sent to a feedback device 145 (e.g., a user providing feedback via this device) to evaluate the results of the trained models 103 on the unlabeled testing dataset and feedback is received by the anomaly detection service/component 102. In some embodiments, the request is in the form of a GUI provided by the console 106 that a user uses to provide input.

The feedback training 109 is engaged based on the response to update the models 103 which, when deployed, can perform anomaly detection on images captured by the image/video capture device 141.

Figure 2:
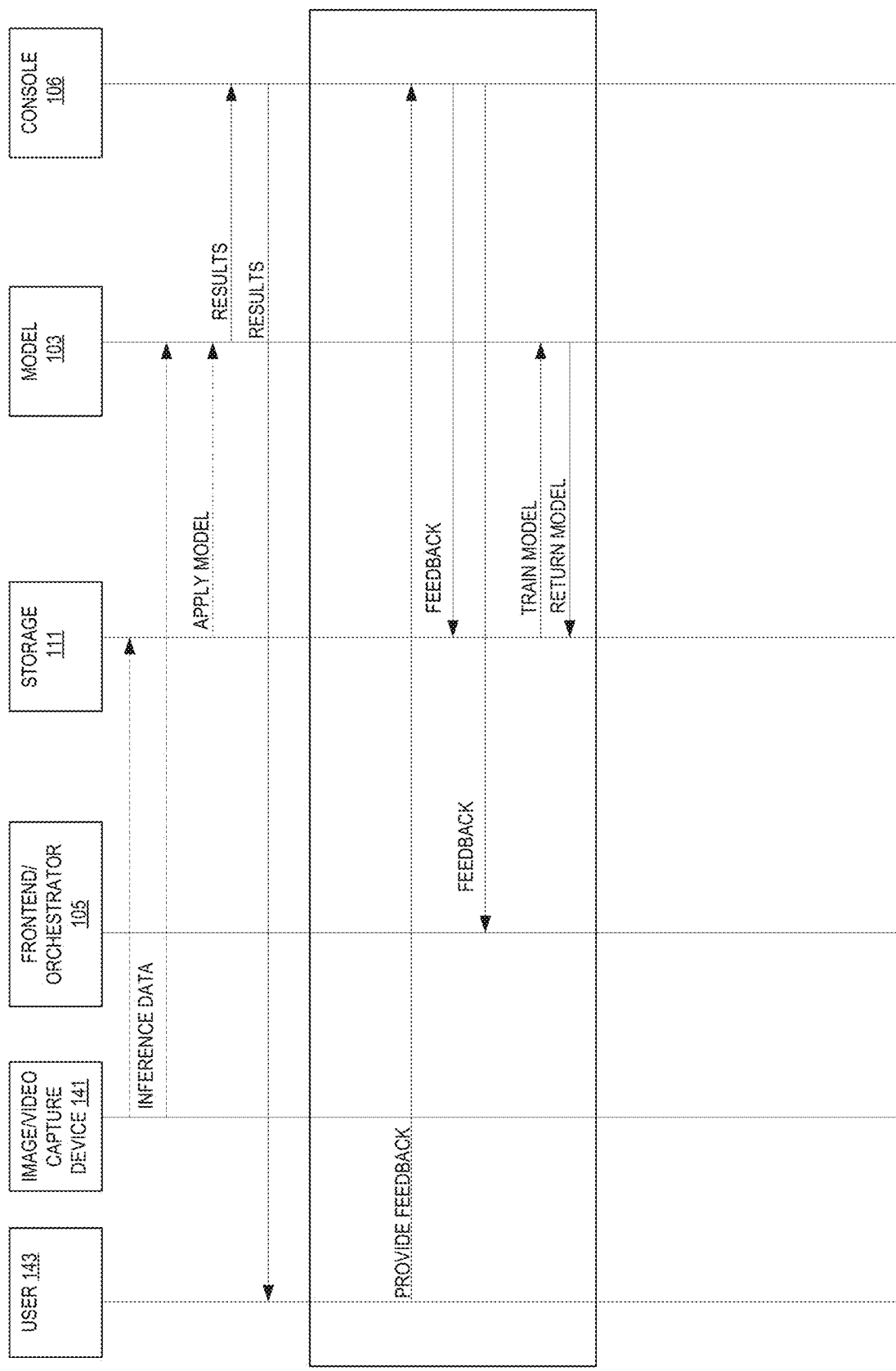
FIG. 2 illustrates a process flow diagram for performing inference using an anomaly detection service/component according to some embodiments.

FIG. 2 illustrates a process flow diagram for performing inference using an anomaly detection service/component according to some embodiments. This flow diagram uses aspects of the anomaly detection service/component 102 along with all of the entities of FIG. 1. However, this is merely used in an illustrative sense and other embodiments of an anomaly detection service/component may be used.

In this example, an image/video capture device 141 (an image source) provides source data such as an image, one or more proper subsets of an image (e.g., crops, extractions, etc.), etc. to either a storage location 111 or a model 103 to be analyzed.

The model 103 is applied to the source data and generates a result which is provided to a console 106 to present to a user 143. Examples of how a result may be presented are detailed later, but may include, but are not limited to: the image evaluated, a score for the image, an indication of anomalous or not, an indication of where an anomaly may be (e.g., a mask over a potential issue), a means for indicating if the prediction is correct (e.g., a means to verify the prediction), etc.

The user 143 may then provide feedback to the console 106 to engage in a feedback re-training of the model 103 (the feedback loop indicted by the large rectangular box). The feedback is provided to a frontend/orchestrator 105 and/or storage 111 (for example to be added to the training dataset) which and is then used to retrain the model 103.

Figure 3:
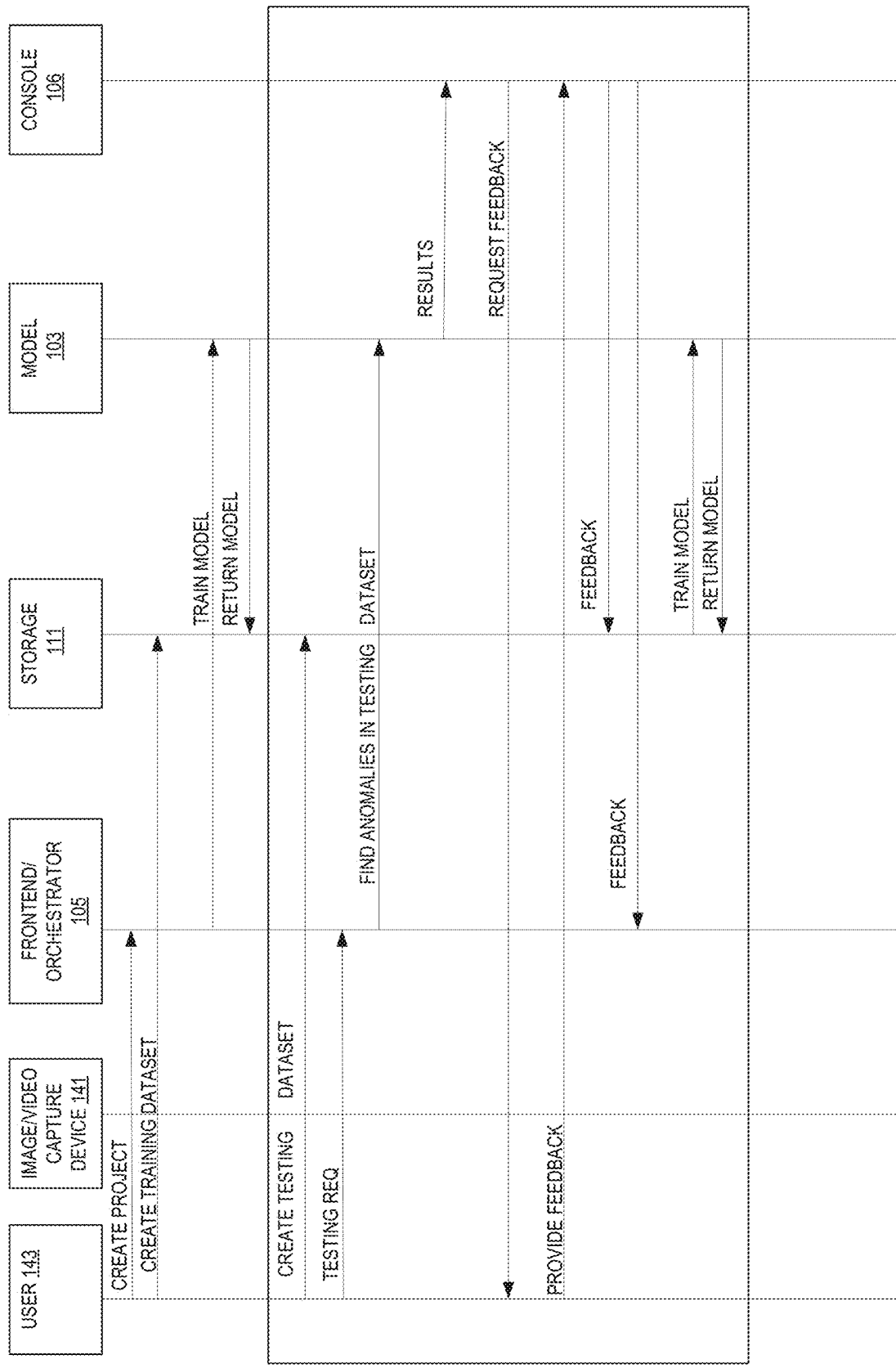
FIG. 3 illustrates a process flow diagram for performing training of one or more ML models using feedback according to some embodiments.

FIG. 3 illustrates a process flow diagram for performing training of one or more ML models using feedback according to some embodiments. This flow diagram uses aspects of the anomaly detection service/component 102 along with all entities of FIG. 1. However, this is merely used in an illustrative sense and other embodiments of an anomaly detection service/component may be used.

In this example, a user creates a project through a frontend/orchestrator. A project is a logical grouping of resources (e.g., images, labels, models, etc.) and operations (e.g., training, evaluation, and detection). The user 143 also creates a training dataset to be used for training the model 103. Examples of how to create that training dataset using one or more GUIs are detailed later. An initial training dataset may include only unlabeled data, labeled data, or a mix of labeled and unlabeled data.

The frontend/orchestrator 105 kicks off the training of the model 103 and the trained model is stored in storage 111 for later use. The user 143 also creates testing a testing dataset. This testing dataset may include labeled and unlabeled data. The user 143 requests testing using the testing dataset via the frontend/orchestrator 105 which engages the model 103 to find anomalies in the testing dataset. The frontend/orchestrator 105 is also responsible, in some embodiments, for handling received annotations/labels, generating training and/or testing datasets, etc.

The results of those attempts at anomaly detection are provided to a console 106 which then requests feedback like what was done in FIG. 2. The user 143 may then provide feedback to the console 106 to engage in a feedback re-training of the model 103 (the feedback loop indicted by the large rectangular box). The feedback is provided to a frontend/orchestrator 105 and/or storage 111 (for example to be added to the training dataset) which and is then used to retrain the model 103.

Figure 4:
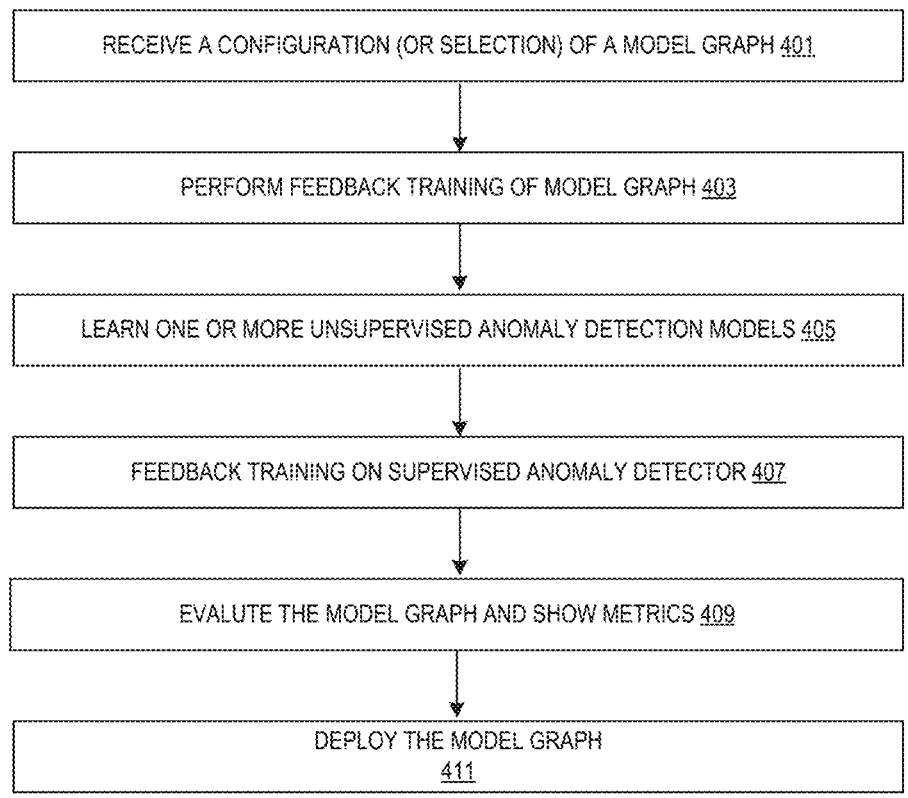
FIG. 4 illustrates embodiments of the training of a model graph according to some embodiments.

In some embodiments, the "model" that is a trained consists of multiple models with each model addressing a different problem type. Exemplary problem types may include, but are not limited to: i) object detection, ii) alignment, iii) unsupervised anomaly detection, and iv) supervised anomaly detection. FIG. 4 illustrates embodiments of the training of a model graph according to some embodiments. Note that subsequent discussions of feedback training or initial training may be applied to the training of individual models or an ensemble of models.

At 401, a configuration (or selection) of a model graph is received. For example, a user can dictate what models are to be used and in what order. In other embodiments, a selection is made for the user based on input from the user (such as answers about questions about the objective(s)). In some embodiments, for local object analysis, the model graph includes one or more of an object detection model, an alignment model, and an anomaly detection model. In some embodiments, for global object analysis, the model graph includes one or more of an object detection model and an anomaly detection model. In some embodiments, for text analysis, the model graph includes an anomaly detection model. In some embodiments, for relative placement analysis, the model graph includes one or more of an object detection model and an alignment model. In some embodiments, for manifest verification, the model graph includes an object detection model. The object detection and alignment models are supervised models and the anomaly model is (semi-)unsupervised.

At 403 feedback training of model graph is performed. In particular, feedback-based training of the non-anomaly detection supervised models of the model graph is performed. Details for feedback training are detailed later. In some embodiments, when training a given model, the user is required to provide annotations only for that model. Hence, in some embodiments, when carrying out feedback training of an object detection model, users will be shown, by default, collections using an image-level view which is optimal for spotting bounding box errors. When carrying feedback training for alignment models users will instead be shown by default singulated objects with only annotations.

At 405, one or more unsupervised anomaly models are learned. Having partially trained a model graph (excluding all anomaly modules) means that inputs to all anomaly modules can now be computed and, accordingly, unsupervised anomaly models can be trained. While a first training run is unsupervised, note that future iterations of might include partial supervision that the anomaly model will exploit by means of semi-supervised learning.

At 407 training is performed on a supervised anomaly detector. The supervised anomaly detector (the entire graph) is evaluated on testing data at 409 and metrics shown. The evaluation may include several actions such as collection exploration, anomaly labeling (annotating), etc. Collection exploration means that after having all inference outputs (and logged image metadata) users are to explore the collection of captured images using multiple ranking and filtering criteria. These include (i) criteria generated by the model (e.g., localized or global anomaly score, number of bounding boxes, anomalies computed on pose estimates), (ii) a selection of images with inference that changed relative to the previous learning step, and/or (iii) image timestamps or a camera identifier. Anomaly labeling is provided with means to efficiently explore a collection in search of anomalous samples allows the user to build an annotated set of anomalous and normal images that can be exploited during model graph evaluation or semi-supervised re-training. The user may further run across false positive anomalies where earlier model graph stages are at fault. Hence, a user may choose to expand each image to visualize all intermediate steps and provide new annotations that the next iteration of the feedback re-training stage will exploit.

At 411 the model graph is deployed.

Note that training may come in different flavors. In a joint model training approach, users provide feedback of all annotation types for all images that they annotate. They then do a training iteration on all the models $\{M_1, \ldots, M_N\}$ in the model graph pipeline and repeat. In an individual model training approach, the user instead trains each model $M_i$ individually. When training a model $M_i$, the user carries out all iterations of the feedback training process for that model until the user can no longer find any model inferences to correct.

Note that when training a model graph pipeline, the feedback training is used to train each model $M_j$ in the pipeline individually, while assuming that upstream models $M_i$, $i<j$ have been trained previously so that inputs to $M_j$ derived from the entire training set are available for feedback training. This may be important because mining for informative examples (i.e., determining a ranking $R_j$ that is useful) assumes that a large pool of examples is available to mine from.

The following describes a plurality of embodiments for GUIs that may be used to interact with an anomaly detection service/component such as anomaly detection service/component 102 of FIG. 1. Note that the content input by a user may be used to generate specific API calls. In some embodiments, a user may use a command line interface to generate similar, or the same, API calls. Note that not all aspects shown are in all embodiments. Additionally, the content and/or functionality of these GUIs may be condensed (using few GUIs) or expanded (using more GUIs).

FIG. 5 illustrates embodiments of a GUI for the creation of an anomaly detection project. A user provides a project name 501 and, in some embodiments, a type of project selection mechanism 503 is provided to the user. For example, a user may select between an image level anomaly detection (indicating the image content is anomalous in general) and a pixel level anomaly detection (indicating a particular region or region of the image content is anomalous). Typically, there is a project per evaluation to be done. For example, in a manufacturing line for cars, there may be separate project for each step in the process (e.g., install of an engine, install of a body panel, etc.). In particular, it is usually beneficial to use a model that has been trained on similar data to that being analyzed.

In some embodiments, during the creation of the project, a user may also choose how a model to use for anomaly detection is used using model selection 505. In this illustration, an automatic selection is used. The user may provide information such as the problem to solve and the anomaly detection service/component 102 will decide what to model(s) to use. For example, different models may be used for local object analysis, global object analysis, texture analysis, relative placement and shape, etc. An ensemble of models may be used when multiple problems are to be addressed. For a manual selection, the user provides a path to model, the model itself, a path to an algorithm, or an algorithm itself.

Each project utilizes a dataset for training and/or testing. Note that in some embodiments, the testing dataset is a subset of the training dataset that has not been labeled. FIG. 6 illustrates embodiments of a GUI for the creation of a dataset. This GUI may be used, in some embodiments, to allow a user to pick a configuration option for the creation of a single dataset or the creation of separate training and testing datasets in the dataset configuration 600 portion of the GUI. In some embodiments, a single dataset will be broken into a separate training and testing datasets by the anomaly detection service/component 102.

The GUI allows for a user to provide a configuration 602 of what image source to use for the dataset. For example, a user may use a selection to import images 603 functionality to select the location of the images of the dataset. Exemplary, but non-limiting examples of such sources include a provider network storage (e.g., storage 111 of FIG. 1), a location on computer local to the user, a location that contains images to be copied, and an import from a different source (such as an online storage location not associated with the provider network).

In this example, the provider network was selected as the location to import images from. The GUI allows a user to designate a storage location QA05 (in this case a path). Additionally, in some embodiments, the GUI allows for a user to select automatic labeling 607 of the images. For example, if a user labels an image has having anomalous content after reviewing the image, it is placed in the anomaly folder.

In some embodiments, items in the dataset can be created from a single item. For example, a single image can be made into multiple images to use for testing and/or training. Option 609 allows a user to configure such usage for an image at location 611. An image may have one or more of: objects detected and extracted, grids extracted, non-identical sized chunks extracted, be cropped, have geometric transformation applied (e.g., rotated, add noise, transform compress), be normalized, be pre-processed, be post-processed, have photometrics changed, etc.

Figure 7:
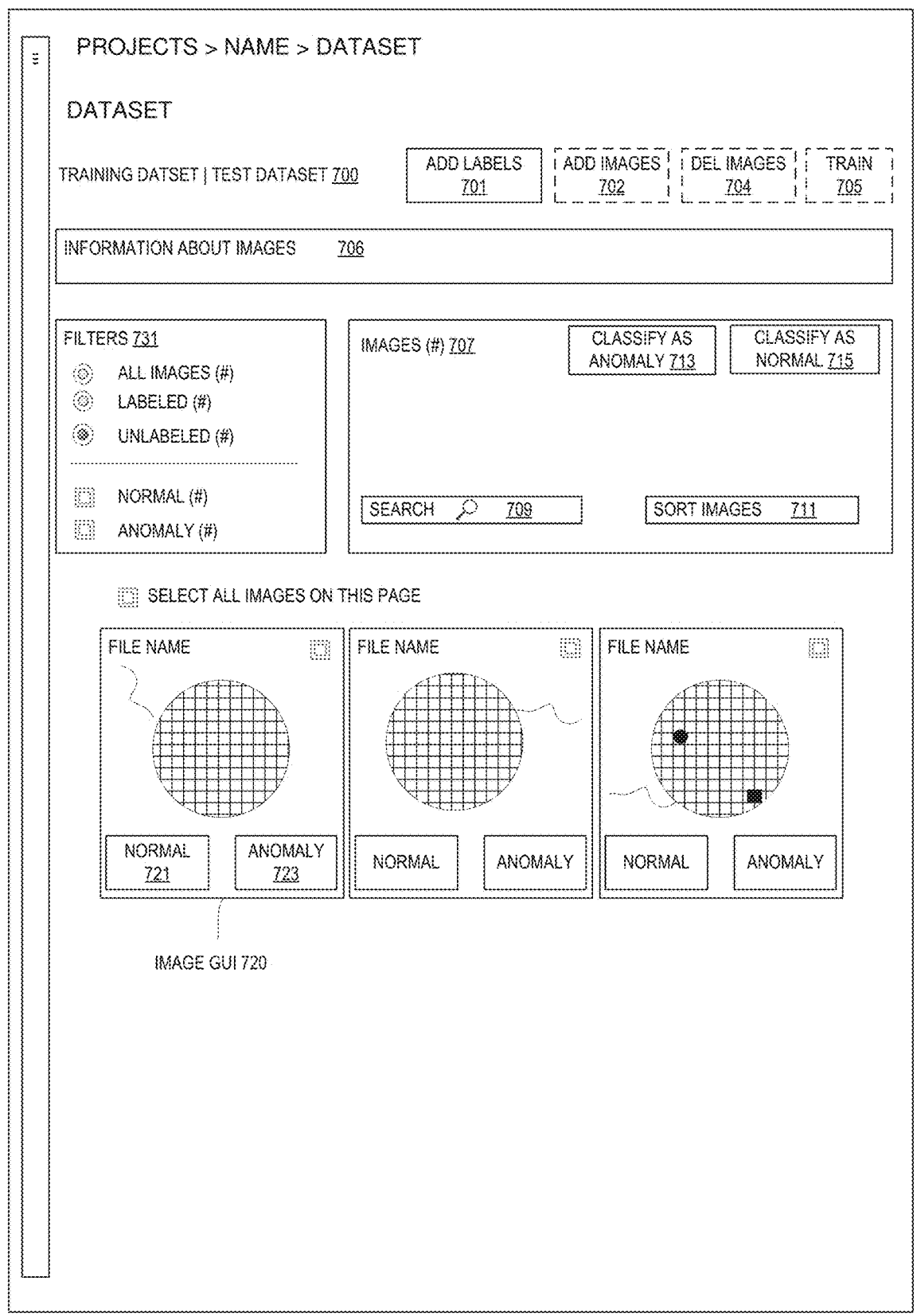
FIG. 7 illustrates embodiments of a GUI for the manipulation of a dataset.

FIG. 7 illustrates embodiments of a GUI for the manipulation of a dataset. As shown, this GUI includes an indication 700 (if needed) of what type of dataset is being manipulated (training or test). The GUI may include one or more actions for the anomaly detection service/component 102 to take based in response to input in this GUI. These actions are selectable using one or more inputs including inputs for one or more of adding labels 701, adding images 702, deleting images 704, and/or training a model based on selected images 704. In this example, images are to be added to the dataset being shown.

In some embodiments, the GUI includes information about the images 706 such as a description of the images (should that have been provided), text indicating how many images are labeled, how many images need to be labeled for training (if needed), etc.

The GUI includes one or more filters 731 in some embodiments. Examples of filters include, but are not limited to showing all images, showing all labeled images, showing all unlabeled images, showing images labeled as normal, and/or showing images labeled as having an anomaly.

In some embodiments, for the images displayed, the GUI includes a number of images shown 707, functionality to search through those images 709, functionality to sort through those images 711 (e.g., by size, name, date, anomaly status, etc.), functionality to classify one or more selected images as anomalous 713, and functionality to classify one or more selected images being normal 715. In particular, the various functionalities shown call a function to be executed.

Additionally, images themselves are shown as individual image GUIs 720. Individual image GUIs 720 may just be the image itself and may also contain additional information such as one or more of a file name and/or a way for a user to label as normal 721 or anomalous 723. Note in some embodiments, a user can use the classification functionality (for example, on multiple images) instead of classifying individually. In some embodiments, a GUI is provided which allows a user to perform for more complex labeling such as providing a way for a user to highlight anomalous areas, orientations, objects to not evaluate, specific areas of an image to evaluate (e.g., in a wide image only looking at a portion of it), etc.

Figure 8:
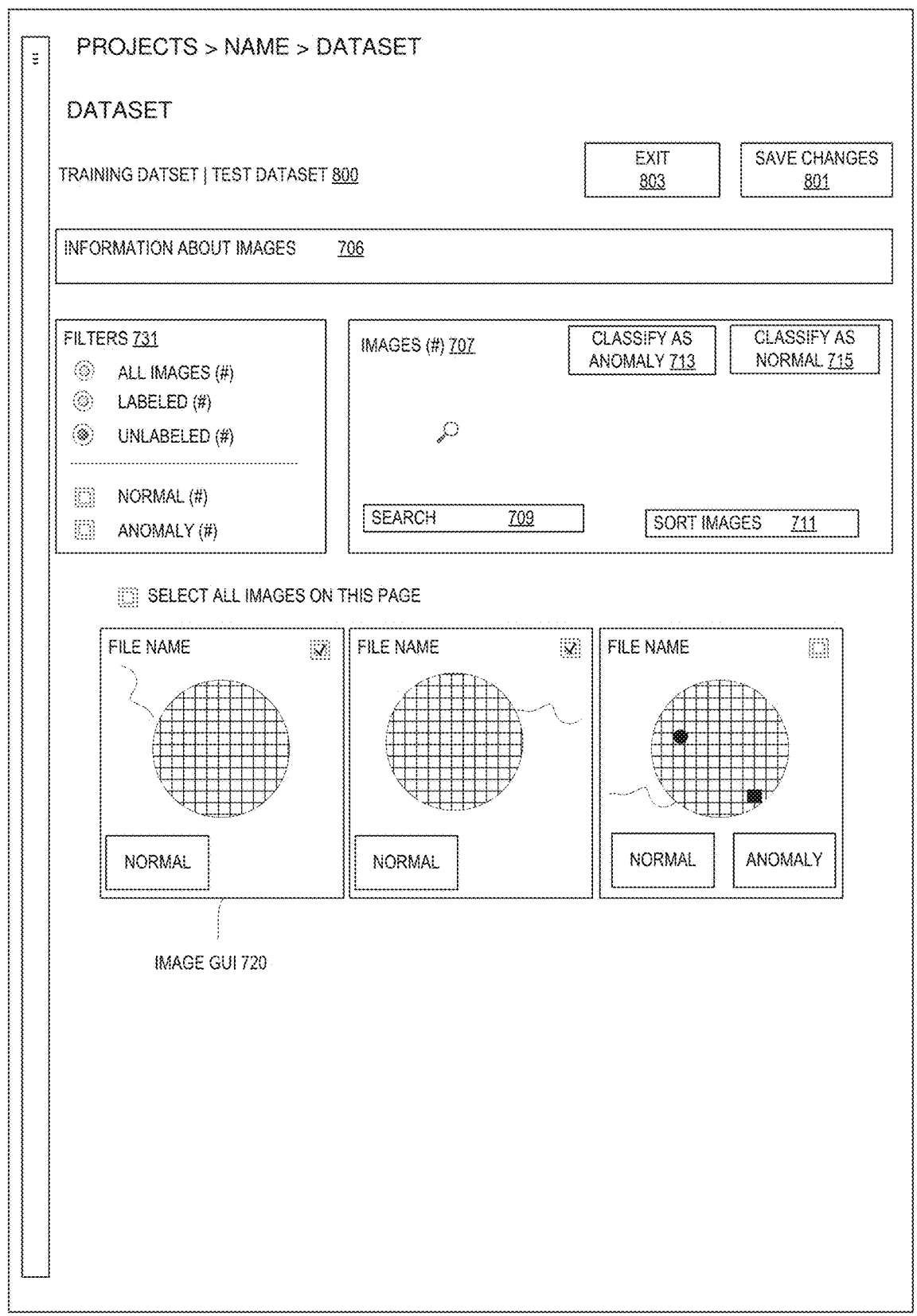
FIG. 8 illustrates embodiments of a GUI for the manipulation of a dataset.

FIG. 8 illustrates embodiments of a GUI for the manipulation of a dataset. This GUI uses the same numbering as FIG. 7, but at a different point in time. In particular, the three images previously shown have two images that are to be marked as normal (those labels can be attached using the save changes functionality 801). The exit functionality 803 leaves this view.

Figure 9:
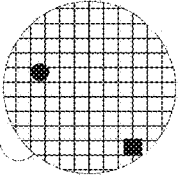
FIG. 9 illustrates embodiments of a GUI for the manipulation of a dataset.

FIG. 9 illustrates embodiments of a GUI for the manipulation of a dataset. This GUI uses the same numbering as FIG. 8, but at a different point in time. In particular, the three images previously shown have two images that have been marked as normal (and are therefore labeled and not shown) and one to now mark as anomalous.

Figure 10:
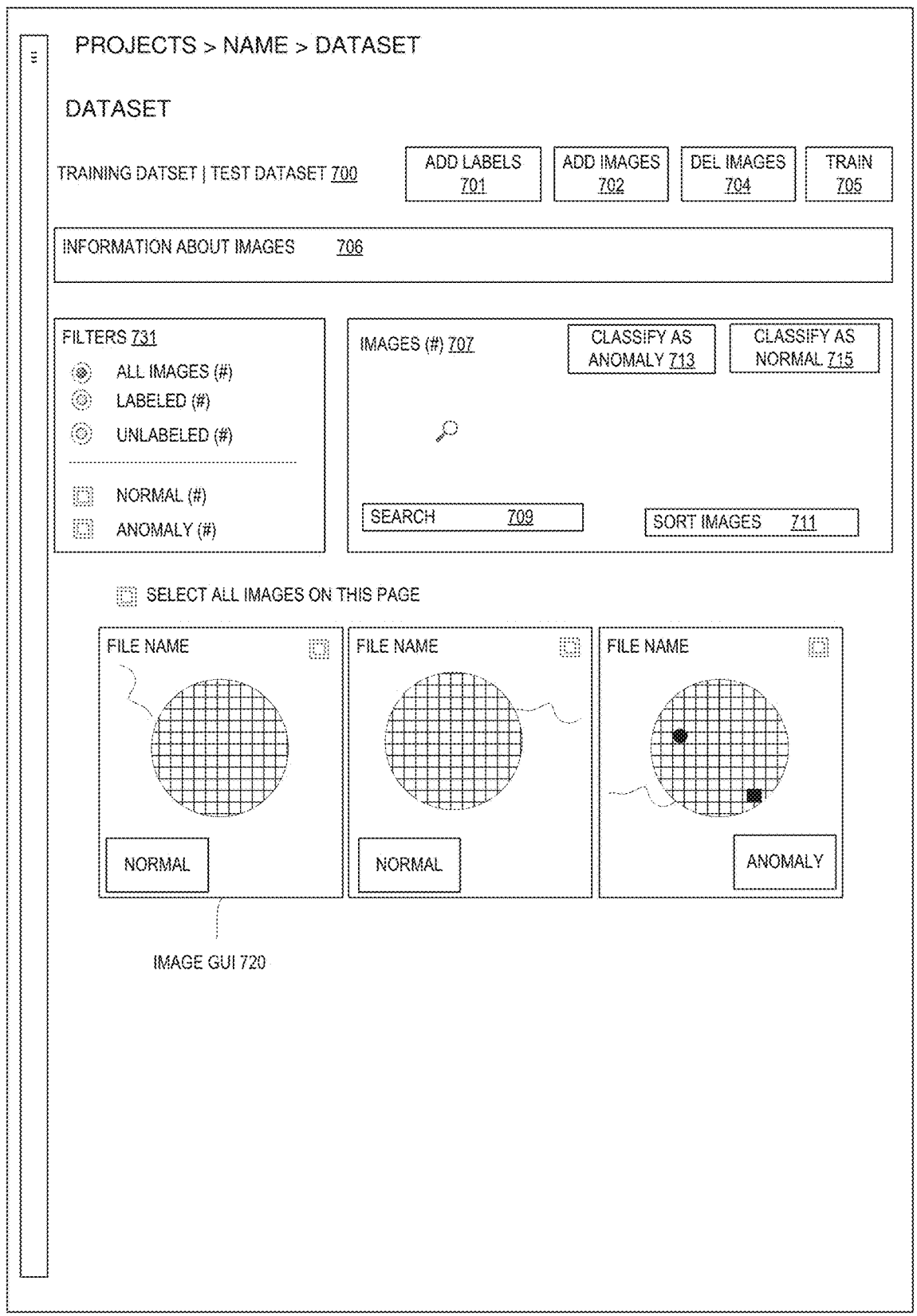
FIG. 10 illustrates embodiments of a GUI for the manipulation of a dataset.

FIG. 10 illustrates embodiments of a GUI for the manipulation of a dataset. This GUI uses the same numbering as FIG. 7, but at a different point in time. In this view, all of the images are shown including their labels.

FIG. 11 illustrates embodiments of a GUI showing the details of a trained model. In some embodiments, this GUI includes information about the model's performance metrics 1101. These metrics may include one or more of how long it took to train 1107, information about the testing images 1109 (such as the total number, the number found anomalous), a precision value 1113, a score value 1111, a recall value 1115, and a threshold used for anomaly detection 11117. Additional information such as the status of the testing 1103 and date of the training 1105 may also be provided.

In some embodiments, advanced metrics 1119, such as a receiver operating characteristic (ROC) curve, area under the curve (AOC), etc. are available for viewing.

In some embodiments, high-level testing results are shown 1120 such as the number of images tested that were correctly predicted as normal, correctly predicted as anomalous, etc.

The GUI includes one or more filters 1131 in some embodiments. Examples of filters include, but are not limited to showing all images, showing all labeled images, showing all unlabeled images, showing images labeled as normal, and/or showing images labeled as having an anomaly.

In some embodiments, for the images displayed, the GUI includes one or more of a number of images shown 1131, functionality to search through those images 1133, functionality to sort through those images 1135 (e.g., by size, name, date, anomaly status, etc.), etc.

Additionally, images themselves are shown as individual image GUIs 1141. Individual image GUIs 1141 may just be the image itself and may also contain additional information such as one or more of a file name, an indication of if the prediction was correct, a prediction indication, and/or a score for the prediction. Note that anomalous image shows where an anomaly was detected (the black circle and black square). In some embodiments, this is shown using a pixel-level mask on top of the image. In some embodiments, the mask may be more general such as having a grid overlaid on the image and an indication of what block of the grid is predicted to have an issue. As will be shown later, in some embodiments a GUI is provided to highlight where issues that should have been spotted, but were not, etc.

FIG. 12 illustrates embodiments of a GUI for configuring usage of a model to perform anomaly detection. In particular, this GUI illustrates aspects of a job configuration 1201 request. The aspects include a selection of a model 1203 to use and an indication location of where unlabeled images will come from to test 1205 such as from a provider network storage (e.g., uploaded from a camera, etc. to storage), from a local file, or from external device(s) (such as streamed in). In this example, the images will come from a provider network storage as given from the storage location 1207. In some embodiments, a user may select how notification for anomalies is to be performed such as via SMS, email, phone call, chat, etc. Functionality to start the detection process is provided via input 1211. The notification may include one or more of an indication of the image with an anomaly, a time the image was taken, what camera took the image, a type of anomaly (orientation, etc.), the anomalous image with a mask overlay showing a potential anomaly location, etc.

Figure 13:
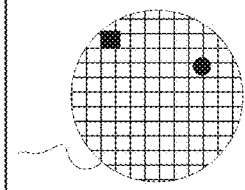
FIG. 13 illustrates embodiments of a GUI for verification of results of inference using model to perform anomaly detection.

FIG. 13 illustrates embodiments of a GUI for verification of results of inference using model to perform anomaly detection. In some embodiments, the GUI includes instructions on what do verification. In some embodiments, high-level testing results are shown 1302 such as the number of images tested that were correctly predicted as normal, correctly predicted as anomalous, etc.

The GUI includes one or more filters 1331 in some embodiments. Examples of filters include, but are not limited to showing all images, showing all labeled images, showing all unlabeled images, showing images labeled as normal, and/or showing images labeled as having an anomaly.

In some embodiments, a user may sort the displayed images using sort function 1323. In this example, the user can sort by confidence, but other types of sorting may be supported such as image size, time to detect anomaly, number of anomalies, number of objects detected, orientation, etc.

In some embodiments, for the images displayed, the GUI includes one or more of a number of images shown 1331, functionality to search through those images 1333, functionality to sort through those images 1335 (e.g., by size, name, date, anomaly status, etc.), verify correctness 1337 or incorrectness 1337.

Additionally, images themselves are shown as individual image GUIs 1341. Individual image GUIs 1341 may just be the image itself and may also contain additional information such as one or more of a file name, prediction indication, and/or a score for the prediction. Additionally, in some embodiments, a function for indicating if the prediction was correct 1343 or incorrect 1345 is provided.

Figure 14:
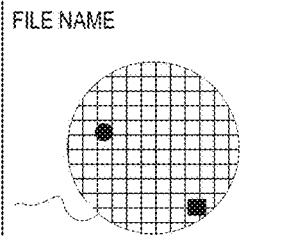
FIG. 14 illustrates embodiments of a GUI for verification of results of inference using model to perform anomaly detection.

FIG. 14 illustrates embodiments of a GUI for verification of results of inference using model to perform anomaly detection. This illustration uses the same numbering as FIG. 11, but adds some additional functionality. In particular, a user can verify an image and then add it to the dataset using function 1401. Added images to the dataset may be used for retraining later.

Figure 15:
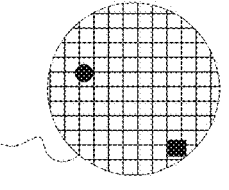
FIG. 15 illustrates embodiments of a GUI for verification of results of inference using model to perform anomaly detection.

FIG. 15 illustrates embodiments of a GUI for verification of results of inference using model to perform anomaly detection. This illustration uses the same numbering as FIG. 11, but adds some additional functionality. In particular, a user can verify an image's prediction using function 1501.

Figure 16:
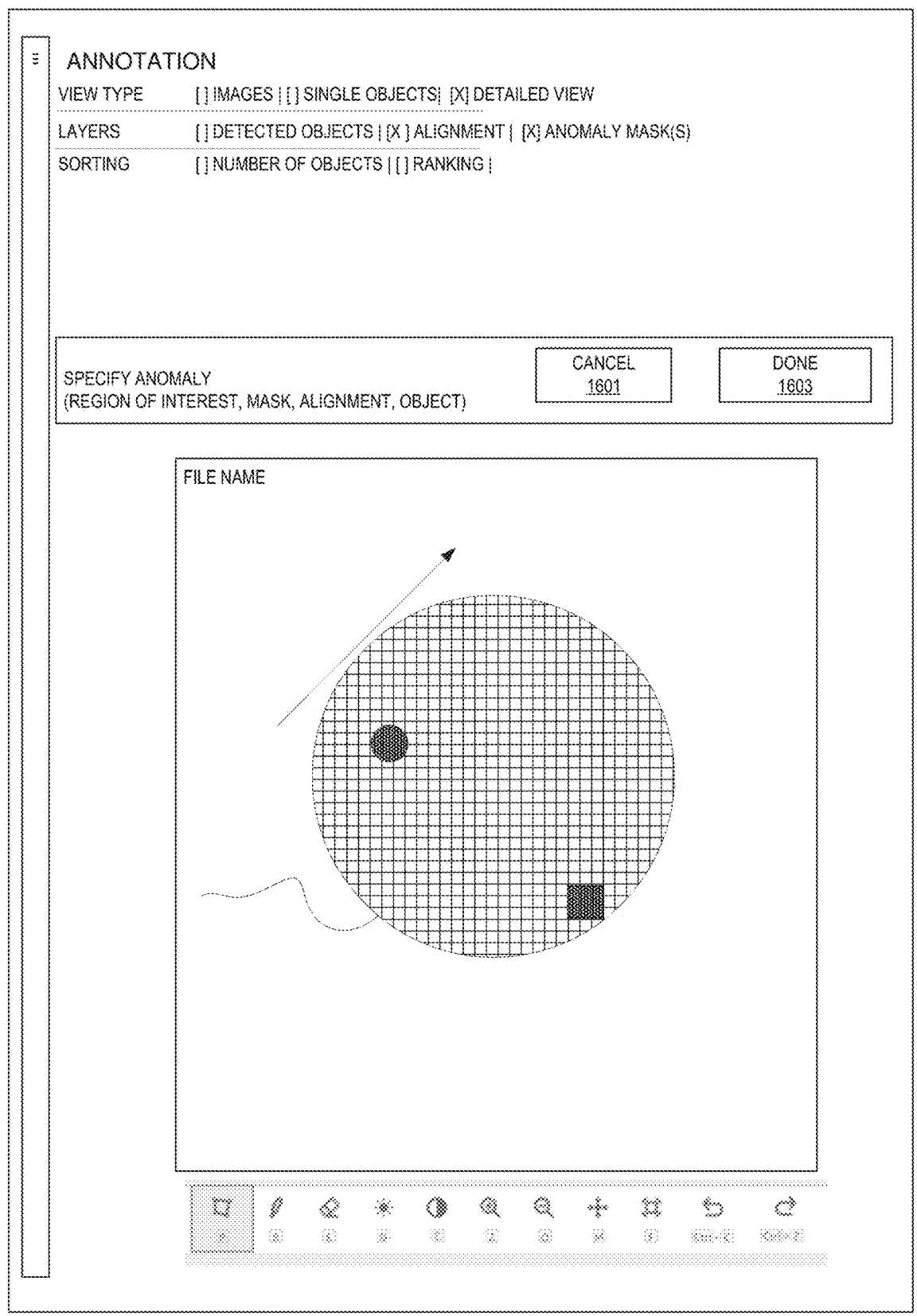
FIG. 16 illustrates embodiments of a GUI for performing more detailed annotation of an image.

FIG. 16 illustrates embodiments of a GUI for performing more detailed annotation of an image. This annotation may be performed on a result of an inference (to correct an improper detection), on a training image (for example, to add alignment information, to indicate regions of interest in an image to perform anomaly detection on, to indicate an anomaly, etc.), etc. Typically, testing images are not corrected.

As shown, the detailed annotation may include several different views (such as a gallery of images, a single image (or object), and a detailed view of a single image (or object)); an indication of what layer(s) to be applied (such as detected objects, alignment, and/or anomaly masks); and/or an indication of how to sort the images (such as by number of objects, ranking, etc.).

In this example, a single anomalous image is shown, and a user has added both an anomaly mask (circle and box), but also an alignment indication (arrow) showing that the image is incorrectly oriented. Note that the same or similar GUI may be used to show what a "normal" image should have for orientation, areas of interest, etc. Other annotations may include a region of interest, an object, an object shape, an object geometry, and an object position.

Functionality to cancel 1601 the annotations and/or accepting the annotations 1603 may also be provided.

Figure 17:
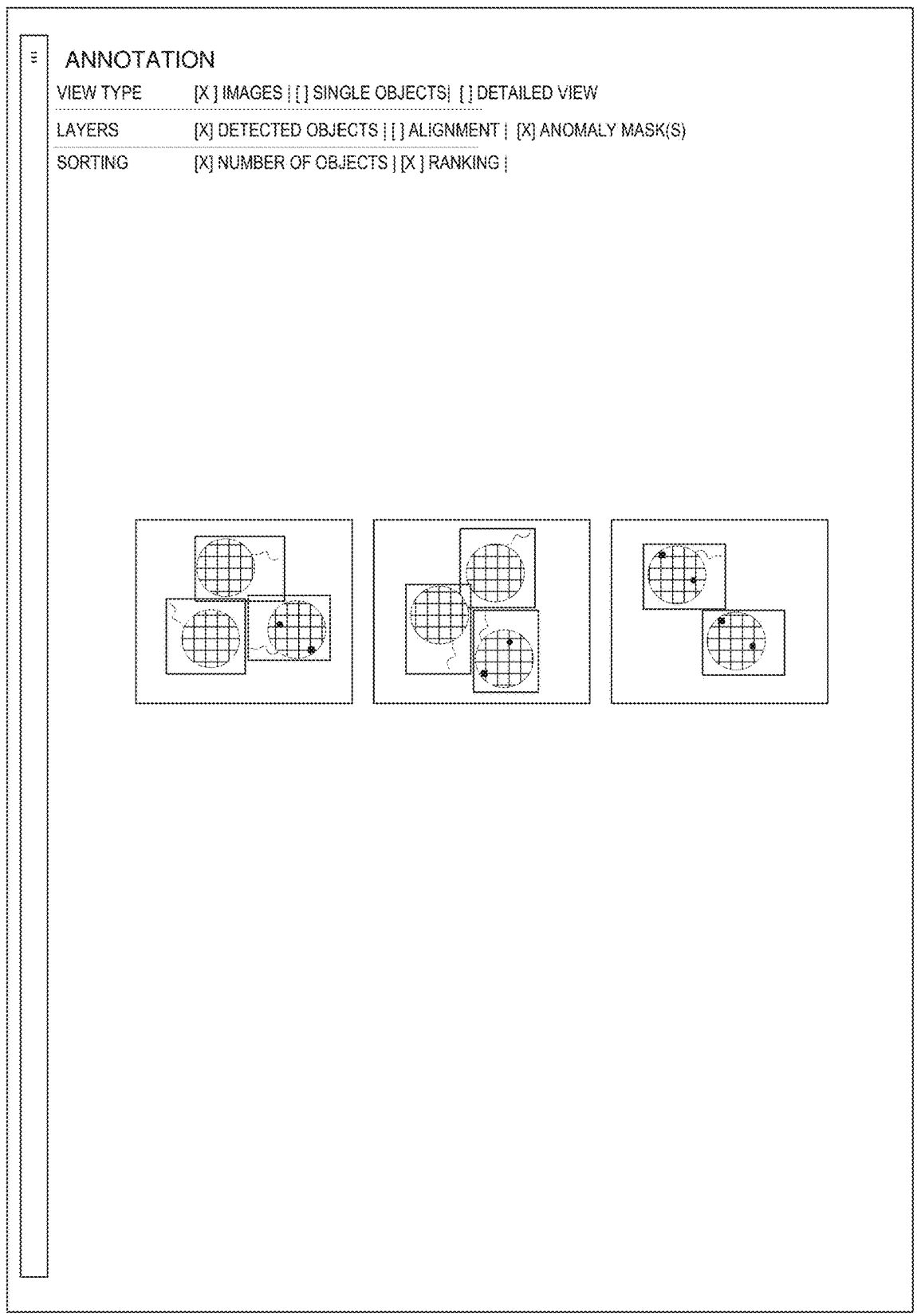
FIG. 17 illustrates embodiments of a GUI for performing more detailed annotation of an image.

FIG. 17 illustrates embodiments of a GUI for performing more detailed annotation or labeling of an image. This GUI shows a plurality of images that are sorted by number of objects first and then ranking. In some embodiments, a user may select individual ones of the images to evaluate under the detailed view.

Figure 18:
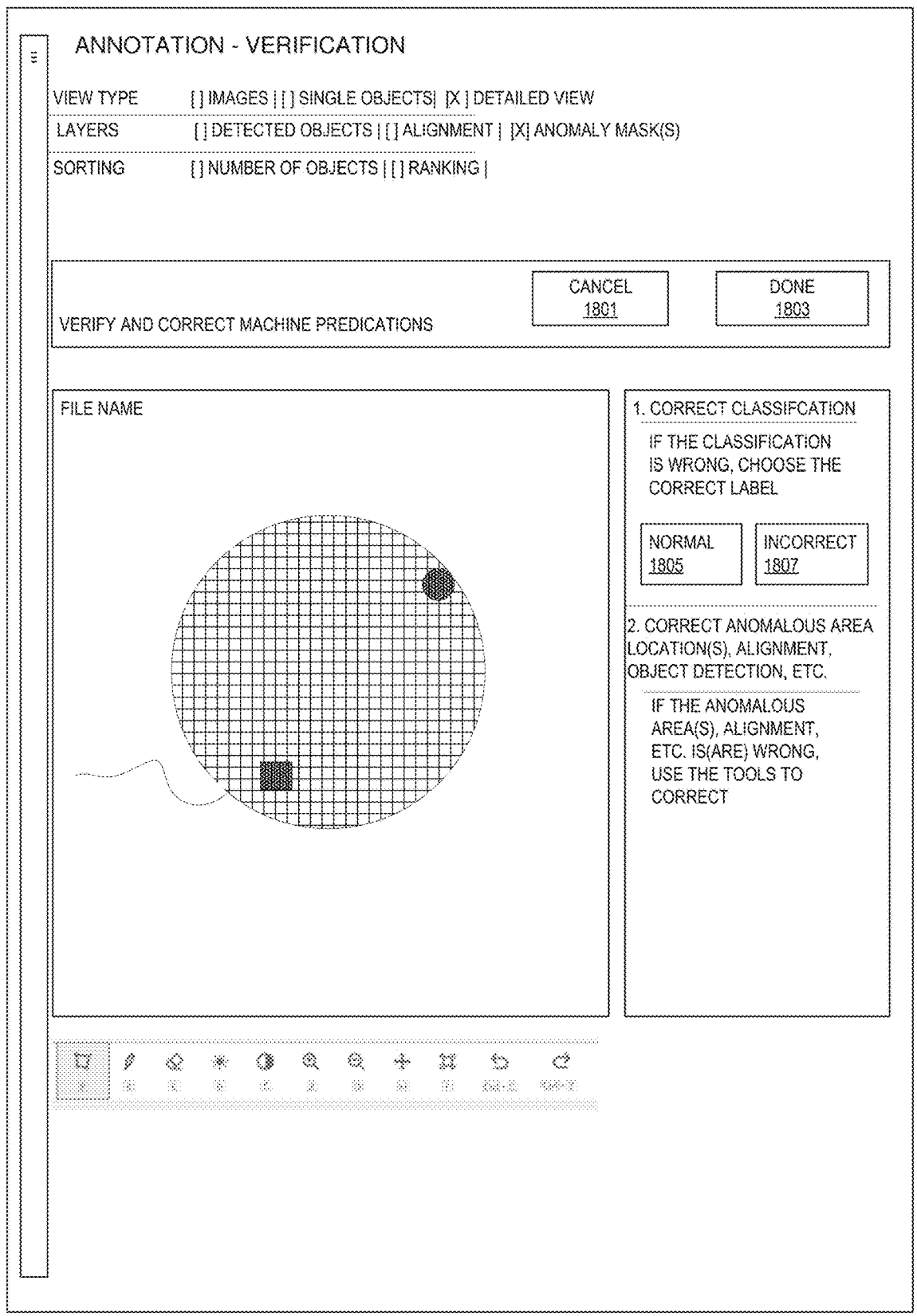
FIG. 18 illustrates embodiments of a GUI for performing verification of an annotation of an image.

FIG. 18 illustrates embodiments of a GUI for performing verification of an annotation of an image. This annotation may be performed on a result of an inference (to correct an improper detection), on a training or testing image (for example, to add alignment information, to indicate regions of interest in an image to perform anomaly detection on, to indicate an anomaly, etc.), etc. Typically, testing images are not corrected.

As shown, the detailed annotation may include several different views (such as a gallery of images, a single image (or object), and a detailed view of a single image (or object)); an indication of what layer(s) to be applied (such as detected objects, alignment, and/or anomaly masks); and/or an indication of how to sort the images (such as by number of objects, ranking, etc.).

In this example, a single anomalous image is shown and there were two anomalies detected. In this GUI, a user can verify is this is correct or incorrect using functionality 1805 or 1807 respectively, and correct prediction (for example, highlight where there is a detected object, alignment error, etc. Functionality to cancel the verification 1801 or accept the verification 1803 may also be provided.

Figure 19:
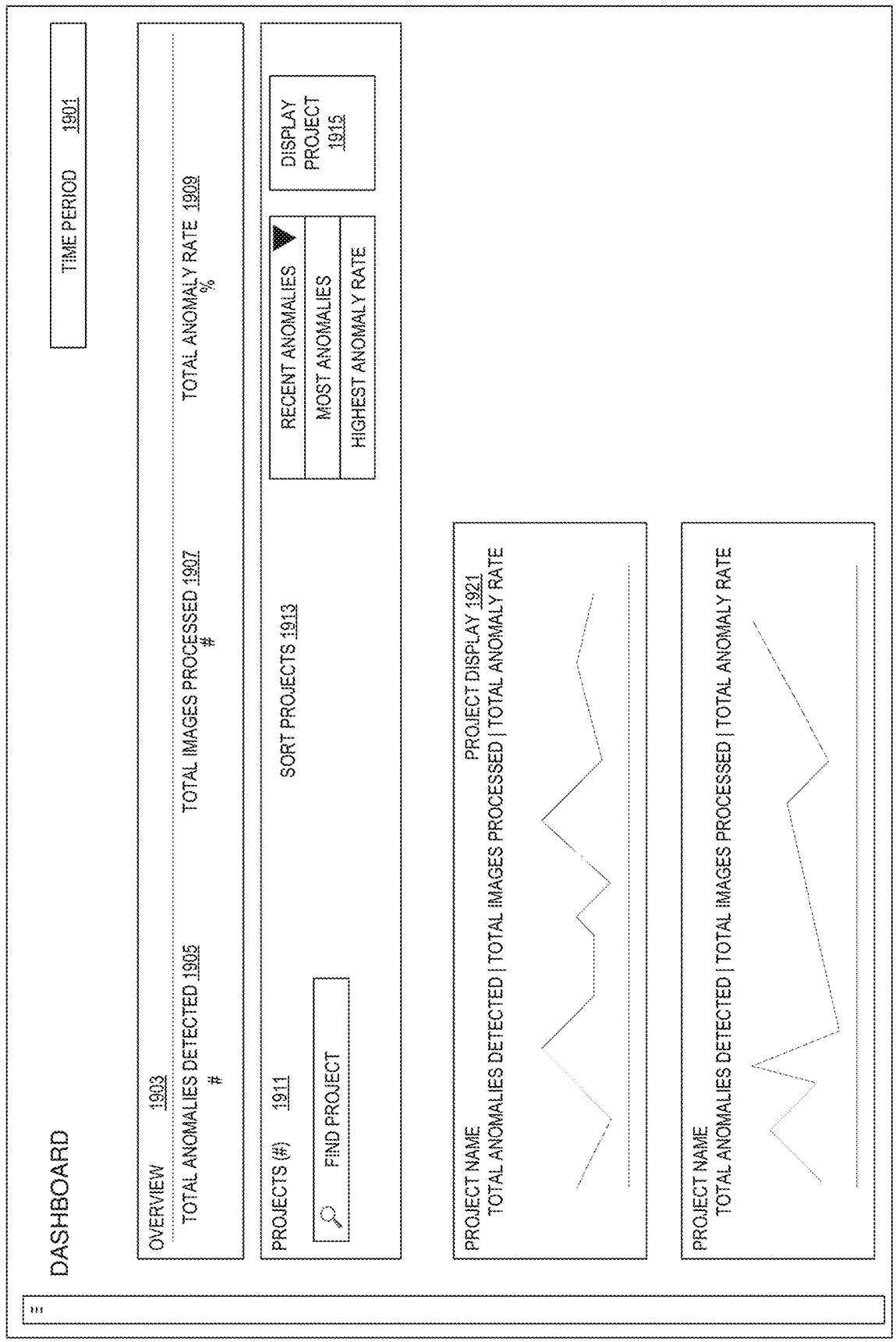
FIG. 19 illustrates embodiments of a GUI for a dashboard for an anomaly detection service.

FIG. 19 illustrates embodiments of a GUI for a dashboard for an anomaly detection service. The dashboard provides a way for a user to view how an anomaly detector is working over a set period of time (which is set using the time period functionality 1901). Note that a user may also ask that anomalies be sent via SMS, email, stored in a particular location, etc.

The dashboard allows a user an overview 1903 showing a total number of anomalies detected 1905, a total number of images processed 1907, and/or an anomaly rate 1909 for the processed images. This will allow a user to determine if there are significant problems with the underlying source of the image content. For example, if 100 images of a product manufacturing line out of 100 images indicate anomalous behavior there is likely an issue that needs urgent addressing. Note that the overview may encompass multiple projects.

A projects section QA011 allows a user to look at (or search for) a particular project. This section includes a means to sort projects 1913 such as by the most recent anomalies, an anomaly rate, the most anomalies, etc. The user can ask that the search for and/or sorted project(s) be displayed using 1915.

Examples of individual projects are also shown. Each project display 1921 includes the project name, an information about the project over time such as the total anomalies, total images processed, total anomaly rate, etc. Note that one or more of those informational pieces may be shown. In some embodiments, clicking on the project name will take the user to a more detailed GUI (such as the verification GUI, a GUI with similar content that allows a user to see particular images that have problems, a model performance GUI such as shown in FIG. 11, etc.).

Figure 20:
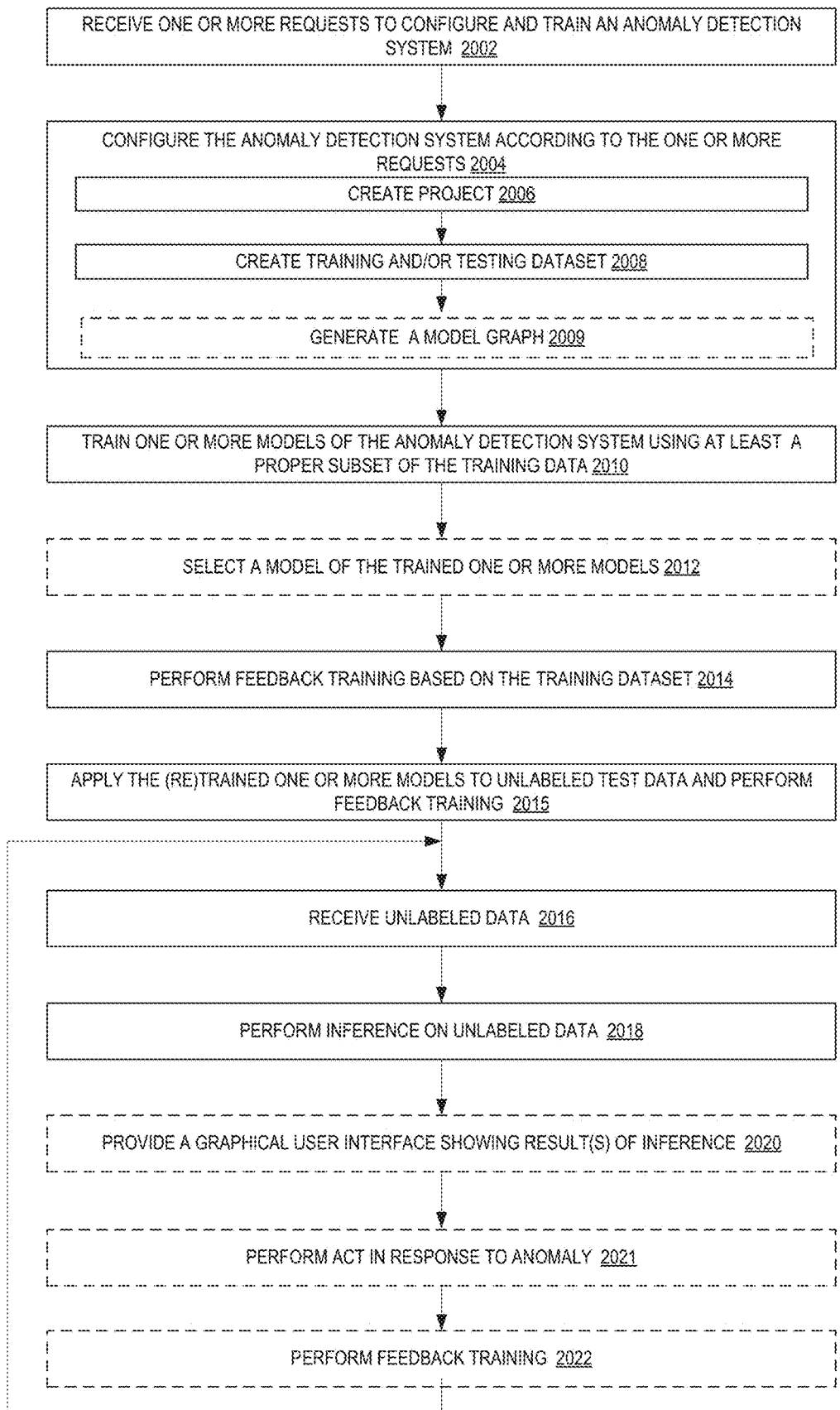
FIG. 20 is a flow diagram illustrating operations of a method for utilizing an anomaly detection service according to some embodiments.

FIG. 20 is a flow diagram illustrating operations of a method for utilizing an anomaly detection service according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the anomaly detection service/component 102 of the other figures.

At 2002 one or more requests to configure and train an anomaly detection system are received. For example, one or more of the GUIs such as in FIG. 5, FIG. 6, FIG. 7, etc. are used to generate API calls to configure and train at least one ML model. Of course, the request may be command line based wherein API calls are directly made.

At 2004 the anomaly detection system is configured according to the one or more requests. For example, in some embodiments, a project is created at 2006 and training and/or testing dataset is/are created at 2008. Note that in some embodiments, the creation of the dataset(s) includes further user input such as labeling of normal, anomalous, a proper (or improper) orientation, identification of regions of interest in an image to look for anomalies, identification of objects to detect, an identification of a model to use to perform object detection, image extraction parameters, cropping parameters, etc.

In some embodiments, a model graph is generated based on a problem to be solved as indicated by a user at 2009. Examples of model graphs may include, but are not limited to: model graphs for local object analysis, global object analysis, texture analysis, relative placement and shape, manifest verification, or a custom model graph.

In some embodiments, a user provides further configurations that may include a determination of directional stationarity mode (horizontal, vertical, none, etc.) and/or a specification of valid image variation ranges (lighting, geometric deformations, hue changes, etc.). This can be done in an ad-hoc manner through a visual interface where users can apply image transformations to test samples.

One or more models of the anomaly detection system are trained using at least a proper subset of the training data at 2010. For example, a model indicated as indicated via a GUI is trained with the generated training data. In some embodiments, one or more models of the trained one or more models is selected at 2012. For example, a "zoo" of models is trained and the model with a best test metric is selected in some embodiments. Exemplary test metrics include classification metrics such as accuracy, precision, recall, ROC, AUC, etc. Of course, other metrics may be used (and, in some embodiments are user selectable) such as detection time, detection cost, etc. Note that the training may include the training of supervised models (e.g., for object detection, alignment, or segmentation) and (semi-) unsupervised models for anomaly detection.

Once the one or more models are trained (and selected as needed) feedback-based training is performed based on the training dataset at 2014. Details of different ways of performing this training are detailed later. In some embodiments, a user is asked to review the output of the model for training images and provide feedback on the veracity of the predictions. The training dataset is then updated to reflect the predictions. In some embodiments, one or more of the previously discussed GUIs is used for feedback.

Once the one or more models are (re-)trained, inference is performed on a training dataset using the one or more (re-)trained models and feedback training is performed based on results of those inferences at 2015. For example, a user is asked to review the output of the model for testing images and provide feedback on the veracity of the prediction. The training dataset is updated to include data that was correctly predicted. Data that was incorrectly predicted may be retried.

At some point later int time, unlabeled data is received at 2016. This unlabeled data is what anomaly detection is to be performed on. For example, the model(s) have been deployed and are ready to start evaluating data.

At 2018 inference is performed on the received unlabeled data using the deployed one or more models. Results of inference may be stored, provided in real-time (or near real-time), provided in alerts (e.g., calls, texts, chat messages, etc.), etc.

At some point, at least one GUI showing result(s) of at least one inference are provided at 2020. The at least one GUI, as noted above, allows a user to determine how a collection of projects are doing, how an individual project is doing, see results of an individual model, annotate errors in results, etc.

In some embodiments, one or more acts are performed in response to a detected anomaly at 2021. For example, an assembly line is stopped, an actuator activated to remove a part, etc. These acts are programmable by a user.

In some embodiments, when needed or desired, feedback training is performed at 2022. For example, a user provides feedback that includes one or more of an indication of a missed anomaly, an indication of an improper alignment, an indication of a proper anomaly result, and an indication of an improper anomaly result which kicks off a retraining cycle.

Figure 21:
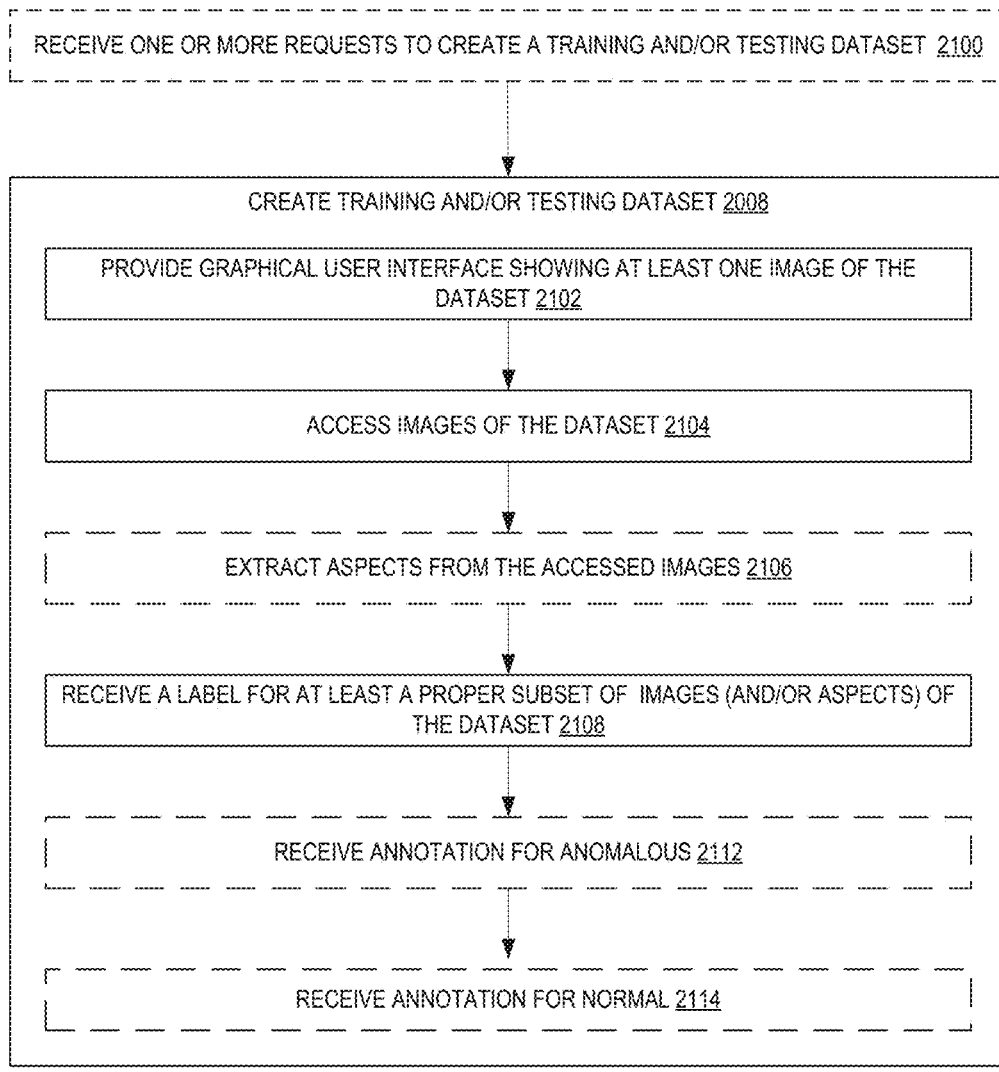
FIG. 21 is a flow diagram illustrating operations of a method for creating a dataset to be used to train and/or test an anomaly detection service according to some embodiments.

FIG. 21 is a flow diagram illustrating operations of a method for creating a dataset to be used to train and/or test an anomaly detection service according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the anomaly detection service/component 102 of the other figures. In particular, in some embodiments, this flow represents the creation of training and/or testing dataset at 2008 of FIG. 20.

In some embodiments, one or more requests to create a training and/or testing dataset are received at 2100. The request may include one or more of at least one of an indication of the at least one image to generate training data from, at least one indication of an operation to perform on the at least one image to generate a plurality of images from the at least one image, and indication of where to store the generated images, etc.

At 2102 a graphical user interface showing at least one image of the dataset is provided. For example, a GUI similar to FIG. 6, FIG. 7, etc. is shown.

Images of the dataset are accessed at 2104 to be potentially viewable. As noted above, in some embodiments, images are filtered so that not all are shown.

In some embodiments, aspects from the accessed images are extracted at 2106. Details of such extractions are detailed in a subsequent figure. However, in general, one or more of regions of interest, objects of interest, portions of a grid overlaid on the images, etc. are extracted. This allows for the model to be trained to have to only look at what is most relevant. For example, in an image having a wide-angled view of a manufacturing floor, only a portion of that view is probably relevant, and that portion can be extracted.

At least one label for at least a proper subset of images (and/or aspects) of the dataset is received at 2108. This label can be determined prior to the accessing of the image (for example, as metadata describing the image) or be provided by a user via a GUI such one of those detailed earlier. The at least one label may be one of anomaly indication or an indication of normal.

In some embodiments, additional information may be provided as a part of annotation for an anomalous labeled image at 2112. For example, a specified orientation, color, mask, etc. of or in the image.

In some embodiments, additional information may be provided as a part of annotation for a normal labeled image at 2114. For example, information regarding a specified orientation, area, object, etc. of or in the image.

Figure 22:
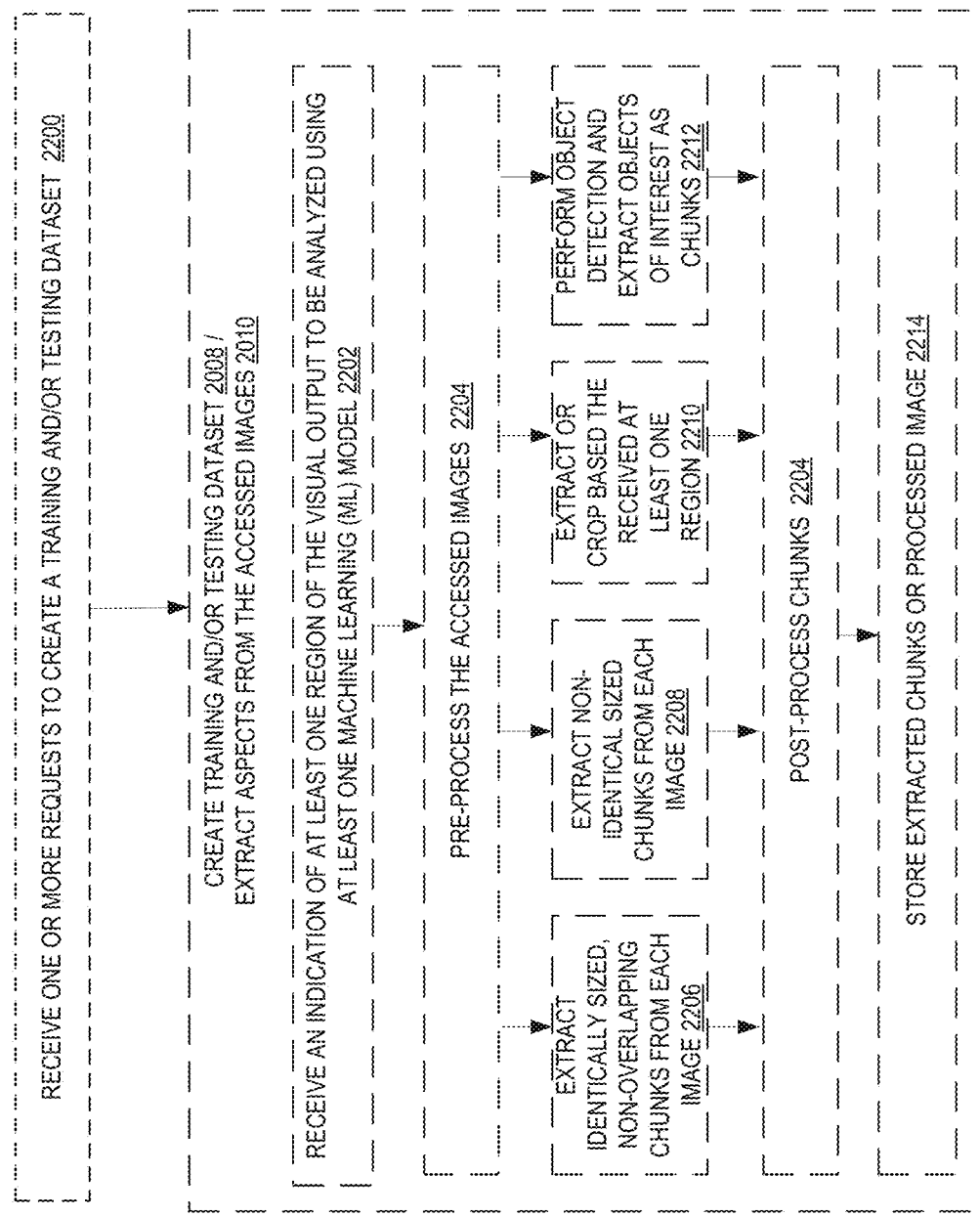
FIG. 22 is a flow diagram illustrating operations of a method for a creation of at least a subset of a training dataset according to some embodiments.

FIG. 22 is a flow diagram illustrating operations of a method for a creation of at least a subset of a training dataset according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the anomaly detection service/component 102 of the other figures.

In some embodiments, this flow diagram is the creation of training and/or testing dataset 2008/extract aspects from the accessed images at 2010 of FIG. 20. Note that this may allow for a single image to provide multiple images for training.

In some embodiments, one or more requests to create a training and/or testing dataset are received at 2200. The request may include one or more of at least one of an indication of the at least one image to generate training data from, at least one indication of an operation to perform on the at least one image to generate a plurality of images from the at least one image, and indication of where to store the generated images, etc.

In some embodiments, at 2202 an indication of at least one region of the visual output to be analyzed using at least one machine learning (ML) model is received. For example, a user can determine which areas of an image should be evaluated and which should be ignored. This would allow for scenarios such as a user indicating that only the upper quarter of an image is to be analyzed for anomalies In some embodiments, this indication of regions of interest comes from utilizing one or more ML models on the image. For example, an object detection model may be applied to find at least one object of interest and the region(s) where that object (or objects) of interest are found are indicated.

At 2204 the accessed images are pre-processed. For example, accessed images may be subjected to geometric transformation (e.g., one or more of rotations, compress, etc.), photometric transformations (e.g., one or more of upscaling, downscaling, hue adjustment, etc.), normalized, etc. In some embodiments, a normalization of a first subset of images is made based on default characteristics of the camera took those differences with respect to the default characteristics of other camera(s) used to take a second subset of images.

In some embodiments, an extraction of identically sized, non-overlapping chunks are extracted from each image performed at 2206. This extraction does not require an explicit indication of regions of interest.

In some embodiments, an extraction of non-identical sized chunks from each image is performed at 2208. These chunks may also overlap. Non-identical sized chunks may lessen the chance that an object of interest is cut into multiple pieces.

In some embodiments, an extraction or cropping based the received at least one region is made at 2210. For example, if an image cannot be clearly broken up has 12 regions of interest that should all contain the same part, etc., the image could be broken down into 12 separate images. In some embodiments, object detection is performed on the images and objects of interest are extracted as chunks at 2212.

In some embodiments, extracted chunks are post-processed at 2214. For example, the chunks may be subjected to geometric transformation (e.g., one or more of rotations, compress, etc.), photometric transformations (e.g., one or more of upscaling, downscaling, hue adjustment, etc.), normalized, etc.

Extracted chunks are stored as images to add to a training or testing dataset at 2214. Note that the entire image may be saved, but a variant that has been subjected to post- or pre-processing.

In a typical model training system, a user is asked for a set of labeled samples and then the labeled samples are used to train a model. However, the number of labeled samples may not be sufficient to obtain the required performance of the model. In such cases, the user can bring in unlabeled samples that pertain to the problem to be solve and let the model generate output on the unlabeled samples. The user can then provide feedback on model output which can be used to generate additional labeled samples to improve model performance. This feedback loop can be executed multiple times until all the unlabeled samples are exhausted or model performance reaches required level. Other annotations may include a region of interest, an object shape, an object geometry, an object, and an object position.

Figure 23:
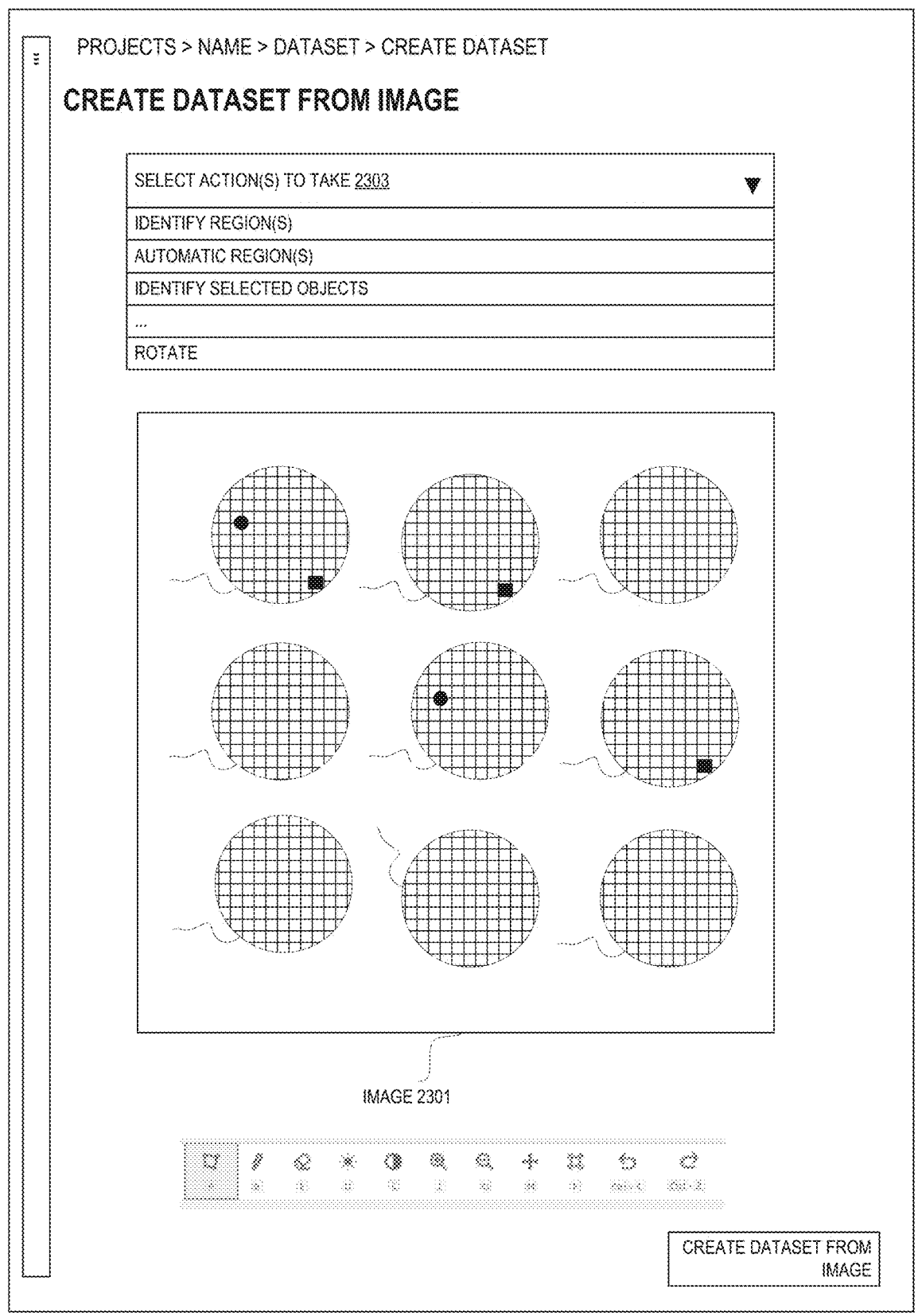
FIG. 23 illustrates embodiments of a graphical user interface for the creation of a dataset from an image.

FIG. 23 illustrates embodiments of a graphical user interface for the creation of a dataset from an image. As shown, the GUI provides a means for a user to select one or more actions to take (e.g., the actions of FIG. 22) for a particular image 2301. Depending on the action to take, tools to provide annotations (e.g., the selection of an object, etc.) are provided.

Figure 24:
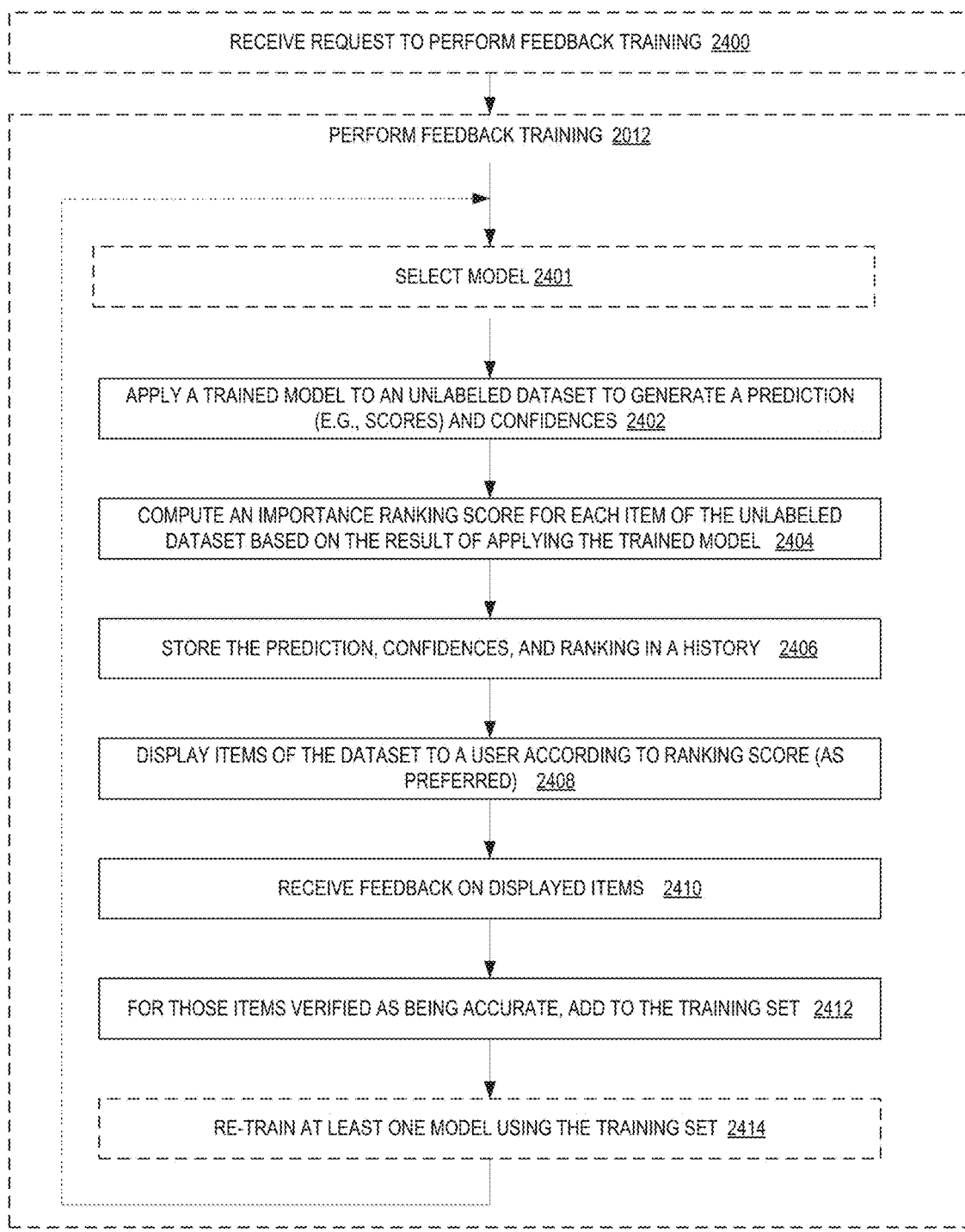
FIG. 24 is a flow diagram illustrating operations of a method for performing feedback training according to some embodiments.

FIG. 24 is a flow diagram illustrating operations of a method for performing feedback training according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the anomaly detection service/component 102 of the other figures. Note that the feedback training need not be for anomaly detection. However, in some embodiments, this flow diagram represents the feedback training of 2012 or 2012 of FIG. 20.

In particular, this flow describes a methodology to improve a system that can perform inference on unlabeled samples by obtaining feedback on model output and using the feedback to update the model. The system uses sample importance on the unlabeled set to select samples for feedback thereby maximizing model performance improvement.

In some embodiments, a request to perform feedback training is received. This request may include one or more of: an identifier of one or more models to (re)train, an identifier of a dataset to use for training, an identifier of a dataset to use for testing, an indication of a threshold for an anomaly, an indication of how to display items to verify (e.g., use of score, confidence, ranking, or combination thereof), an indication of where to store historical information (e.g., data points, scores, confidences, and/or rankings), etc.

In some embodiments, a model of a zoo of models is selected to perform feedback training on at 2401.

At 2402 a trained model is applied to a dataset of items to generate predictions (e.g., score) and, in some embodiments, confidences in those predictions. For example, an anomaly detection model is applied to an unlabeled dataset to look for anomalies and provide a confidence in its predictions. In some embodiments, the dataset includes augmentation class information that should be invariant (such as lighting conditions). In some embodiments, the dataset is at least partially annotated. In some embodiments, the dataset is unlabeled.

An importance ranking score is computed for each item of the unlabeled dataset based on the result of applying the trained model at 2404. The ranking of the training set items is made in terms of how informative (when re-annotated) those items might be.

In some embodiments, the importance ranking score is a weighted anomaly score based on the probably that the item was classified correctly. A high probability suggests a correct classification. The higher the importance score, the more important an item is to review (e.g., the most anomalous). Other rankings include the confidence scores.

The prediction information, confidences, and ranking scores are stored in a history at 2406. This history allows for the system to account for ranking of an item at a particular time (e.g., (re-)training cycle). Further, the histories can be used during inference to attempt to correct of model outputs.

The items of the dataset (e.g., images) along with the predictions are displayed a user at 2408. In some embodiments, the items are displayed by ranking. In some embodiments, a user can select how ranking scores are used to order (e.g., higher ranking are shown first, etc.). For example, in some embodiments, the top-ranked images are then shown to the user together with the corresponding model inferences $A_{M}$.

Feedback on the items displayed is received at 2410. Exemplary feedback has been detailed above.

For those items verified as being accurate according to the received feedback, those items are added to the training set at 2412 for use in later trainings In some embodiments, errors are in the prediction are corrected (e.g., using annotations as discussed above) and the corrected annotations provided.

At 2414 the model is re-trained using the training set.

Figure 25:
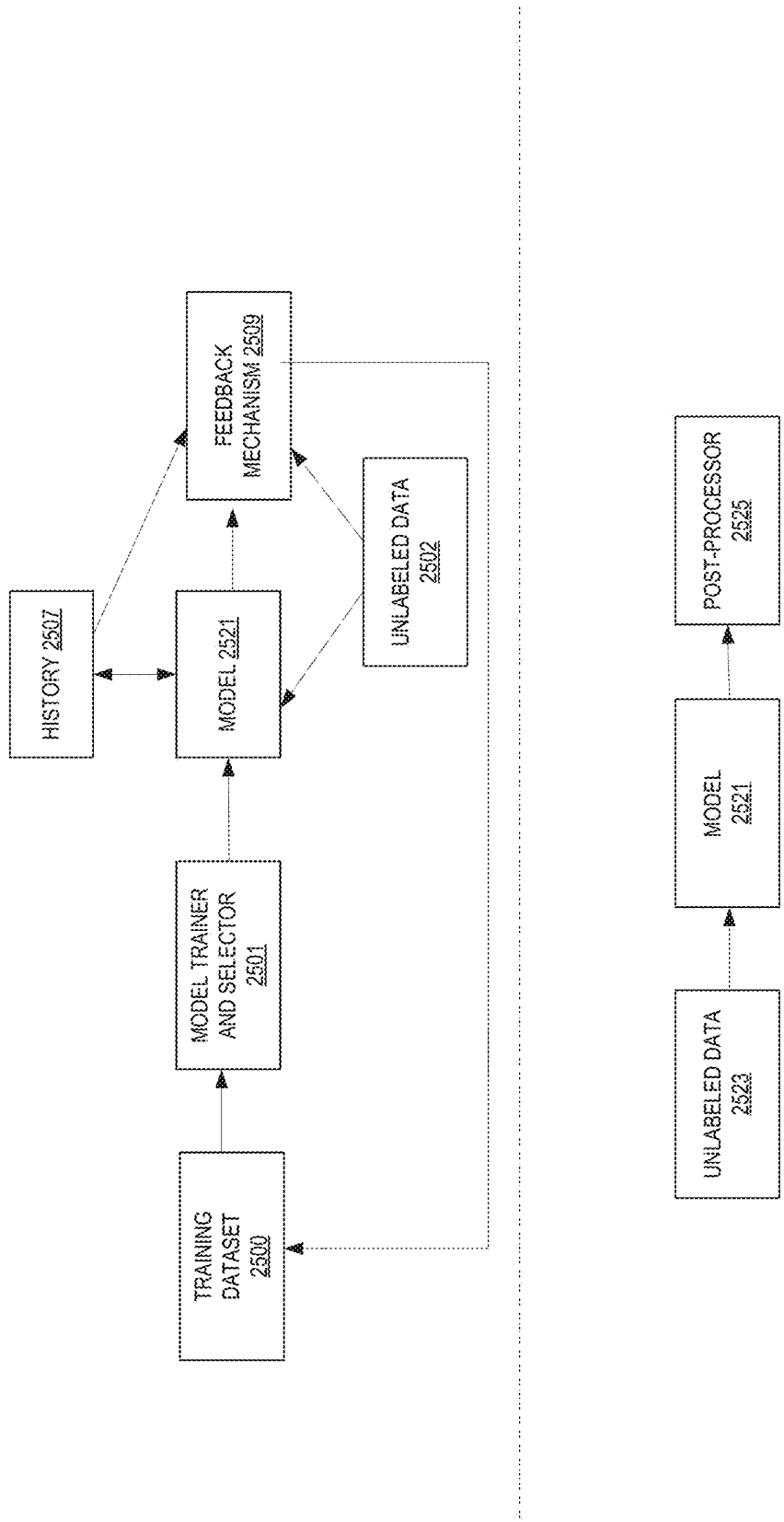
FIG. 25 illustrates embodiments of components used for feedback training and components used in inference post-feedback training.

FIG. 25 illustrates embodiments of components used for feedback training and components used in inference post-feedback training. In particular, a training set 2500 available at time t is used to train a set of models and a selection of the best model 2521 from the set is chosen by the model trainer and selector 2501. The selected model 2521 is then applied to unlabeled data 2502 compute sample importance scores, ranking information, and/or predictions for the unlabeled set which are stored in a history 2507. A feedback mechanism 2509 from a user on selected samples from the unlabeled data and augments the training set for the next iteration based on the feedback. For example, the feedback mechanism may show the user the images and corresponding predictions in a manner dictated by one or more of the importance scores and ranking information.

The deployed inference system (shown in the bottom half) takes in unlabeled data 2523, applies the model 2521 25 to determine anomalous behavior. In some embodiments, further post-processing may be performed by post-processor 2525 (such as ordering results, providing the results to a particular service or person, generating alerts, etc.).

Figure 26:
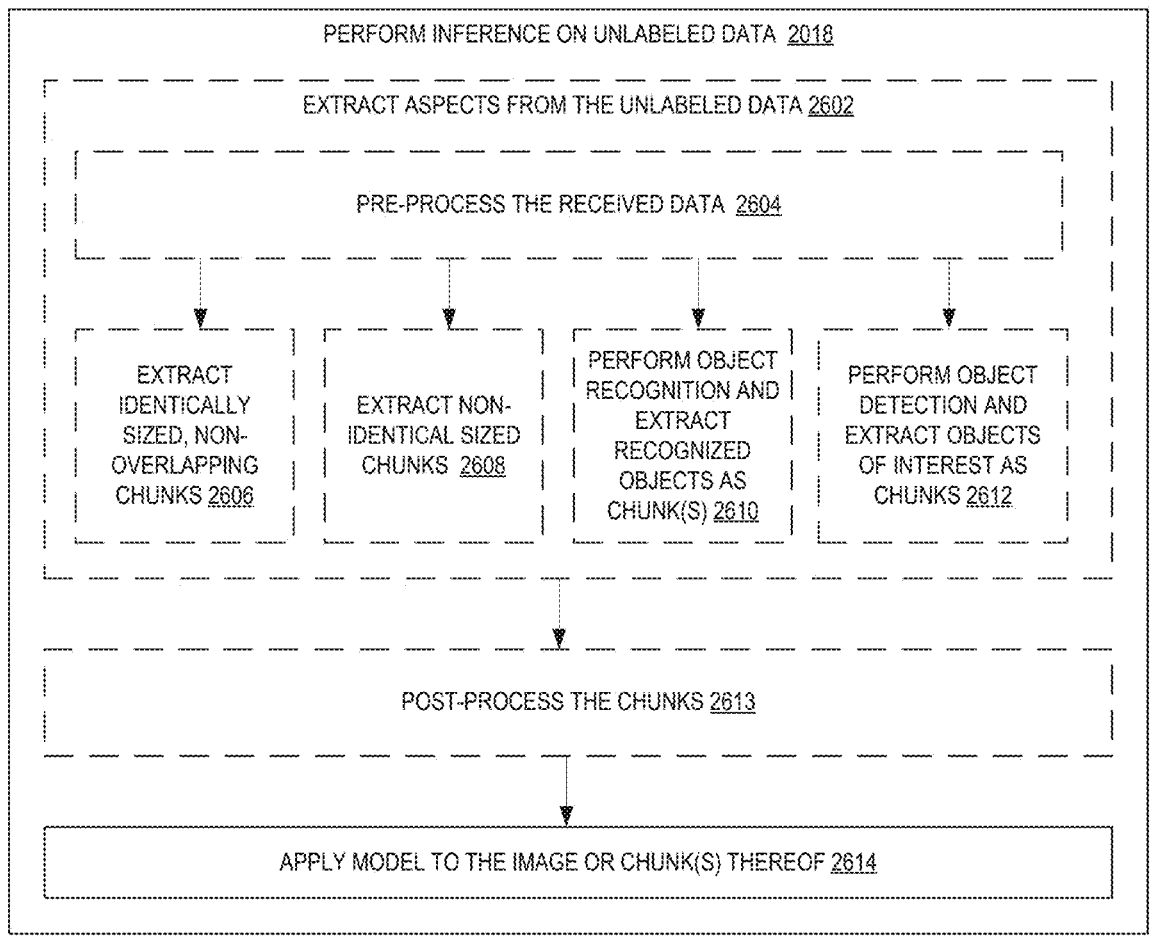
FIG. 26 is a flow diagram illustrating operations of a method for performing inference in an anomaly detection service according to some embodiments.

FIG. 26 is a flow diagram illustrating operations of a method for performing inference in an anomaly detection service according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the anomaly detection service/component 102 of the other figures. In some embodiments, this flow represents the performing inference on unlabeled data at 2018 of FIG. 20.

In some embodiments, aspects are extracted from the unlabeled data (such as an image) at 2602. This extraction may include multiple acts. In some embodiments, at 2604 the accessed data is pre-processed. For example, accessed images may be up-scaled, color adjusted, normalized, etc. In some embodiments, a normalization of a first subset of images is made based on default characteristics of the camera took those differences with respect to the default characteristics of other camera(s) used to take a second subset of images.

In some embodiments, an extraction of identically sized, non-overlapping chunks are extracted from each image performed at 2606. This extraction does not require an explicit indication of regions of interest.

In some embodiments, an extraction of non-identical sized chunks from each image is performed at 2608. These chunks may also overlap. Non-identical sized chunks may lessen the chance that an object of interest is cut into multiple pieces.

In some embodiments, an extraction or cropping based a received indication of regions is made at 2610. For example, if an image cannot be clearly broken up has 12 regions of interest that should all contain the same part, etc., the image could be broken down into 12 separate images. In some embodiments, object detection is performed on the images and objects of interest are extracted as chunks at 2612.

In some embodiments, chunks are post-processed at 2614. Examples of post- and pre-processing have been detailed above. Note that post- and/or -pre-processing may be applied to entire images too.

At 2614 a ML model is applied to the image or chunk(s) thereof to generate a prediction. In some embodiments, the prediction is corrected based on historical data.

Figure 27:
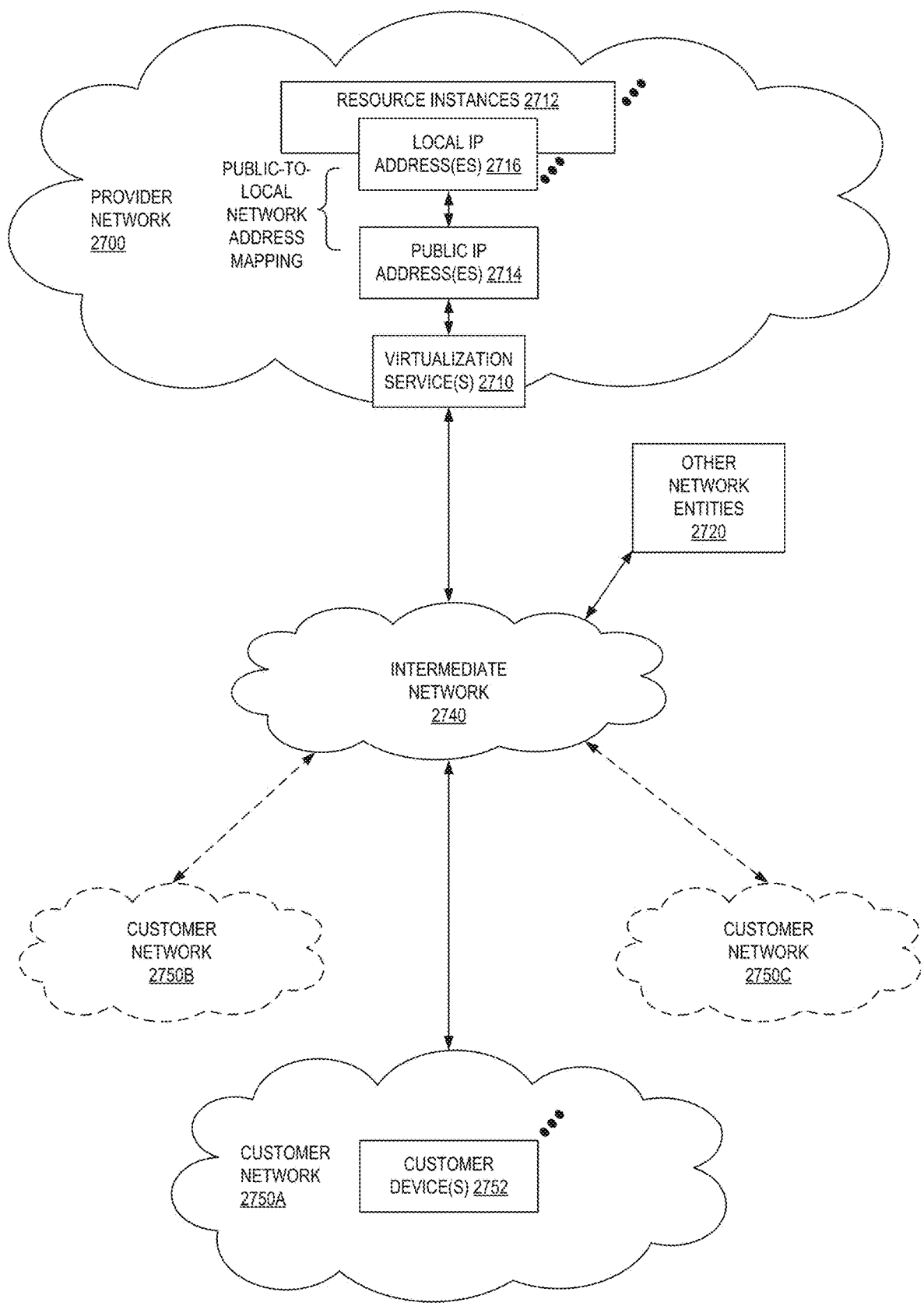
FIG. 27 illustrates an example provider network environment according to some embodiments.

FIG. 27 illustrates an example provider network (or "service provider system") environment according to some embodiments. A provider network 2700 may provide resource virtualization to customers via one or more virtualization services 2710 that allow customers to purchase, rent, or otherwise obtain instances 2712 of virtualized resources, including but not limited to computation and storage resources, implemented on devices within the provider network or networks in one or more data centers. Local Internet Protocol (IP) addresses 2716 may be associated with the resource instances 2712; the local IP addresses are the internal network addresses of the resource instances 2712 on the provider network 2700. In some embodiments, the provider network 2700 may also provide public IP addresses 2714 and/or public IP address ranges (e.g., Internet Protocol version 4 (IPv4) or Internet Protocol version 6 (IPv6) addresses) that customers may obtain from the provider 2700.

Conventionally, the provider network 2700, via the virtualization services 2710, may allow a customer of the service provider (e.g., a customer that operates one or more client networks 2750A-2750C including one or more customer device(s) 2752) to dynamically associate at least some public IP addresses 2714 assigned or allocated to the customer with particular resource instances 2712 assigned to the customer. The provider network 2700 may also allow the customer to remap a public IP address 2714, previously mapped to one virtualized computing resource instance 2712 allocated to the customer, to another virtualized computing resource instance 2712 that is also allocated to the customer. Using the virtualized computing resource instances 2712 and public IP addresses 2714 provided by the service provider, a customer of the service provider such as the operator of customer network(s) 2750A-2750C may, for example, implement customer-specific applications and present the customer's applications on an intermediate network 2740, such as the Internet. Other network entities 2720 on the intermediate network 2740 may then generate traffic to a destination public IP address 2714 published by the customer network(s) 2750A-2750C; the traffic is routed to the service provider data center, and at the data center is routed, via a network substrate, to the local IP address 2716 of the virtualized computing resource instance 2712 currently mapped to the destination public IP address 2714. Similarly, response traffic from the virtualized computing resource instance 2712 may be routed via the network substrate back onto the intermediate network 2740 to the source entity 2720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 2700; a customer may then assign their allocated public IP addresses to particular resource instances allocated to the customer. These public IP addresses may be referred to as customer public IP addresses, or simply customer IP addresses. Instead of being assigned by the provider network 2700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 28:
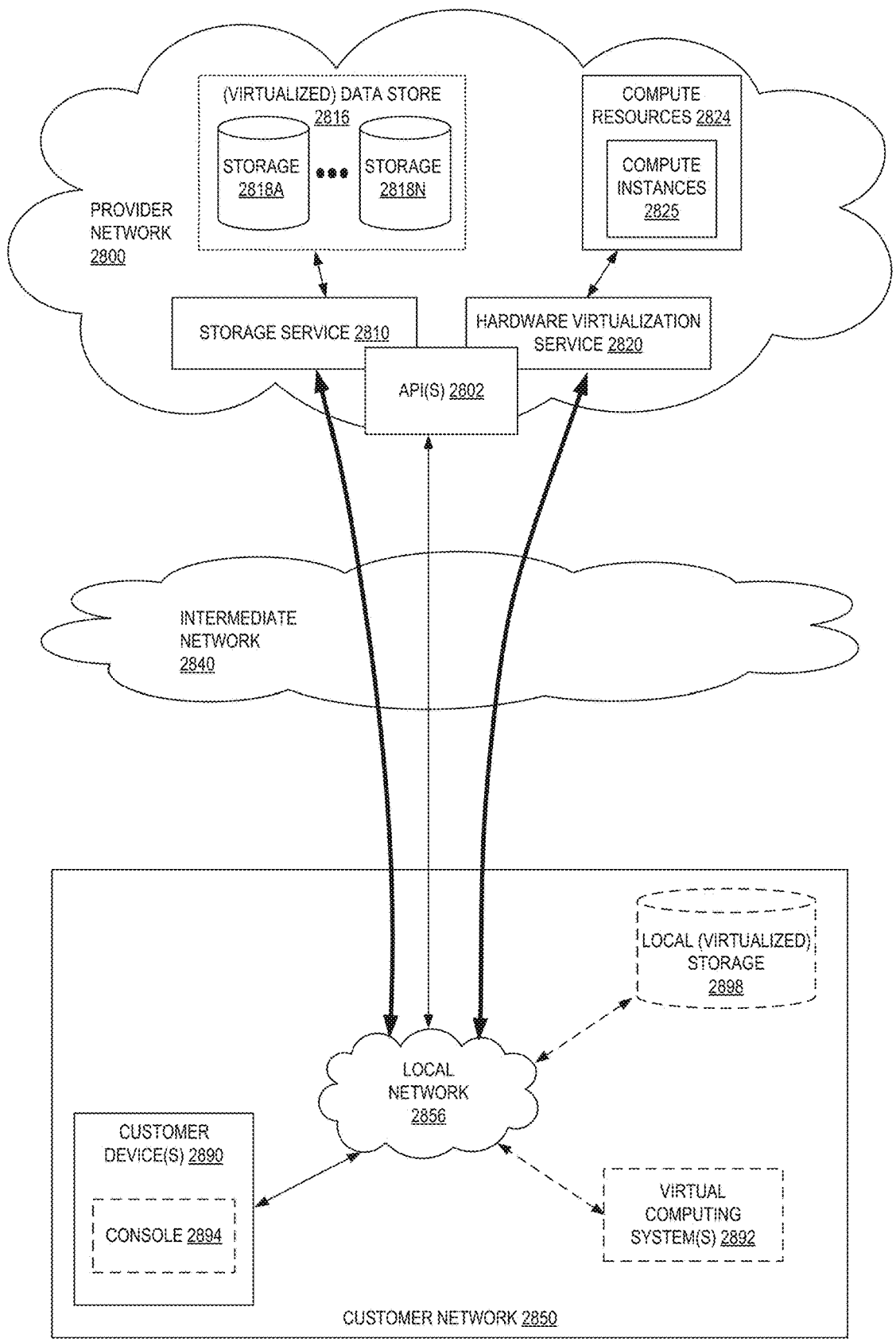
FIG. 28 is a block diagram of an example provider network that provides a storage service and a hardware virtualization service to customers according to some embodiments.

FIG. 28 is a block diagram of an example provider network that provides a storage service and a hardware virtualization service to customers, according to some embodiments. Hardware virtualization service 2820 provides multiple compute resources 2824 (e.g., compute instances 2825 such as VMs) to customers. The compute resources 2824 may, for example, be rented or leased to customers of the provider network 2800 (e.g., to a customer that implements customer network 2850). Each computation resource 2824 may be provided with one or more local IP addresses. Provider network 2800 may be configured to route packets from the local IP addresses of the compute resources 2824 to public Internet destinations, and from public Internet sources to the local IP addresses of compute resources 2824.

Provider network 2800 may provide a customer network 2850, for example coupled to intermediate network 2840 via local network 2856, the ability to implement virtual computing systems 2892 via hardware virtualization service 2820 coupled to intermediate network 2840 and to provider network 2800. In some embodiments, hardware virtualization service 2820 may provide one or more APIs 2802, for example a web services interface, via which a customer network 2850 may access functionality provided by the hardware virtualization service 2820, for example via a console 2894 (e.g., a web-based application, standalone application, mobile application, etc.). In some embodiments, at the provider network 2800, each virtual computing system 2892 at customer network 2850 may correspond to a computation resource 2824 that is leased, rented, or otherwise provided to customer network 2850.

From an instance of a virtual computing system 2892 and/or another customer device 2890 (e.g., via console 2894), the customer may access the functionality of storage service 2810, for example via one or more APIs 2802, to access data from and store data to storage resources 2818A-2818N of a virtual data store 2816 (e.g., a folder or "bucket", a virtualized volume, a database, etc.) provided by the provider network 2800. In some embodiments, a virtualized data store gateway (not shown) may be provided at the customer network 2850 that may locally cache at least some data, for example frequently-accessed or critical data, and that may communicate with storage service 2810 via one or more communications channels to upload new or modified data from a local cache so that the primary store of data (virtualized data store 2816) is maintained. In some embodiments, a user, via a virtual computing system 2892 and/or on another customer device 2890, may mount and access virtual data store 2816 volumes via storage service 2810 acting as a storage virtualization service, and these volumes may appear to the user as local (virtualized) storage 2898.

While not shown in FIG. 28, the virtualization service(s) may also be accessed from resource instances within the provider network 2800 via API(s) 2802. For example, a customer, appliance service provider, or other entity may access a virtualization service from within a respective virtual network on the provider network 2800 via an API 2802 to request allocation of one or more resource instances within the virtual network or within another virtual network.

Illustrative Systems

Figure 29:
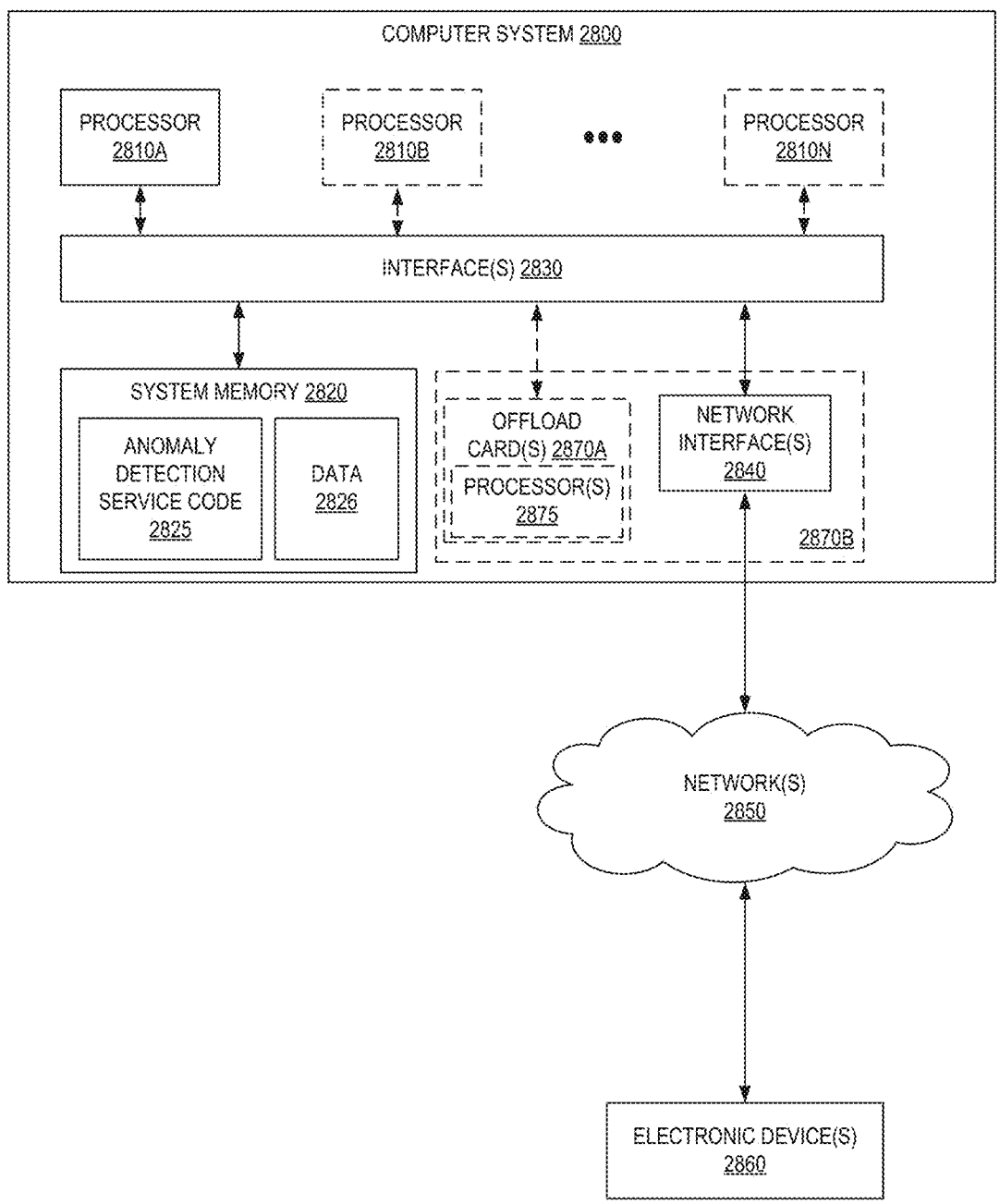
FIG. 29 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 2900 illustrated in FIG. 29. In the illustrated embodiment, computer system 2900 includes one or more processors 2910 coupled to a system memory 2920 via an input/output (I/O) interface 2930. Computer system 2900 further includes a network interface 2940 coupled to I/O interface 2930. While FIG. 29 shows computer system 2900 as a single computing device, in various embodiments a computer system 2900 may include one computing device or any number of computing devices configured to work together as a single computer system 2900.

In various embodiments, computer system 2900 may be a uniprocessor system including one processor 2910, or a multiprocessor system including several processors 2910 (e.g., two, four, eight, or another suitable number). Processors 2910 may be any suitable processors capable of executing instructions. For example, in various embodiments, processors 2910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 2910 may commonly, but not necessarily, implement the same ISA.

System memory 2920 may store instructions and data accessible by processor(s) 2910. In various embodiments, system memory 2920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 2920 as anomaly detection service code 2925 (e.g., executable to implement, in whole or in part, the anomaly detection service/component 102) and data 2926.

In one embodiment, I/O interface 2930 may be configured to coordinate I/O traffic between processor 2910, system memory 2920, and any peripheral devices in the device, including network interface 2940 or other peripheral interfaces. In some embodiments, I/O interface 2930 may perform any necessary protocol, timing or other data transformations to convert data signals from one component (e.g., system memory 2920) into a format suitable for use by another component (e.g., processor 2910). In some embodiments, I/O interface 2930 may include support for devices attached through various types of peripheral buses, such as a variant of the Peripheral Component Interconnect (PCI) bus standard or the Universal Serial Bus (USB) standard, for example. In some embodiments, the function of I/O interface 2930 may be split into two or more separate components, such as a north bridge and a south bridge, for example. Also, in some embodiments some or all of the functionality of I/O interface 2930, such as an interface to system memory 2920, may be incorporated directly into processor 2910.

Network interface 2940 may be configured to allow data to be exchanged between computer system 2900 and other devices 2960 attached to a network or networks 2950, such as other computer systems or devices as illustrated in FIG. 1, for example. In various embodiments, network interface 2940 may support communication via any suitable wired or wireless general data networks, such as types of Ethernet network, for example. Additionally, network interface 2940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 2900 includes one or more offload cards 2970A or 2970B (including one or more processors 2975, and possibly including the one or more network interfaces 2940) that are connected using an I/O interface 2930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 2900 may act as a host electronic device (e.g., operating as part of a hardware virtualization service) that hosts compute resources such as compute instances, and the one or more offload cards 2970A or 2970B execute a virtualization manager that can manage compute instances that execute on the host electronic device. As an example, in some embodiments the offload card(s) 2970A or 2970B can perform compute instance management operations such as pausing and/or un-pausing compute instances, launching and/or terminating compute instances, performing memory transfer/copying operations, etc. These management operations may, in some embodiments, be performed by the offload card(s) 2970A or 2970B in coordination with a hypervisor (e.g., upon a request from a hypervisor) that is executed by the other processors 2910A-2910N of the computer system 2900. However, in some embodiments the virtualization manager implemented by the offload card(s) 2970A or 2970B can accommodate requests from other entities (e.g., from compute instances themselves), and may not coordinate with (or service) any separate hypervisor.

In some embodiments, system memory 2920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2900 via I/O interface 2930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 2900 as system memory 2920 or another type of memory. Further, a computer-accessible medium may include transmission media or signals such as electrical, electromagnetic, or digital signals, conveyed via a communication medium such as a network and/or a wireless link, such as may be implemented via network interface 2940.

Figure 30:
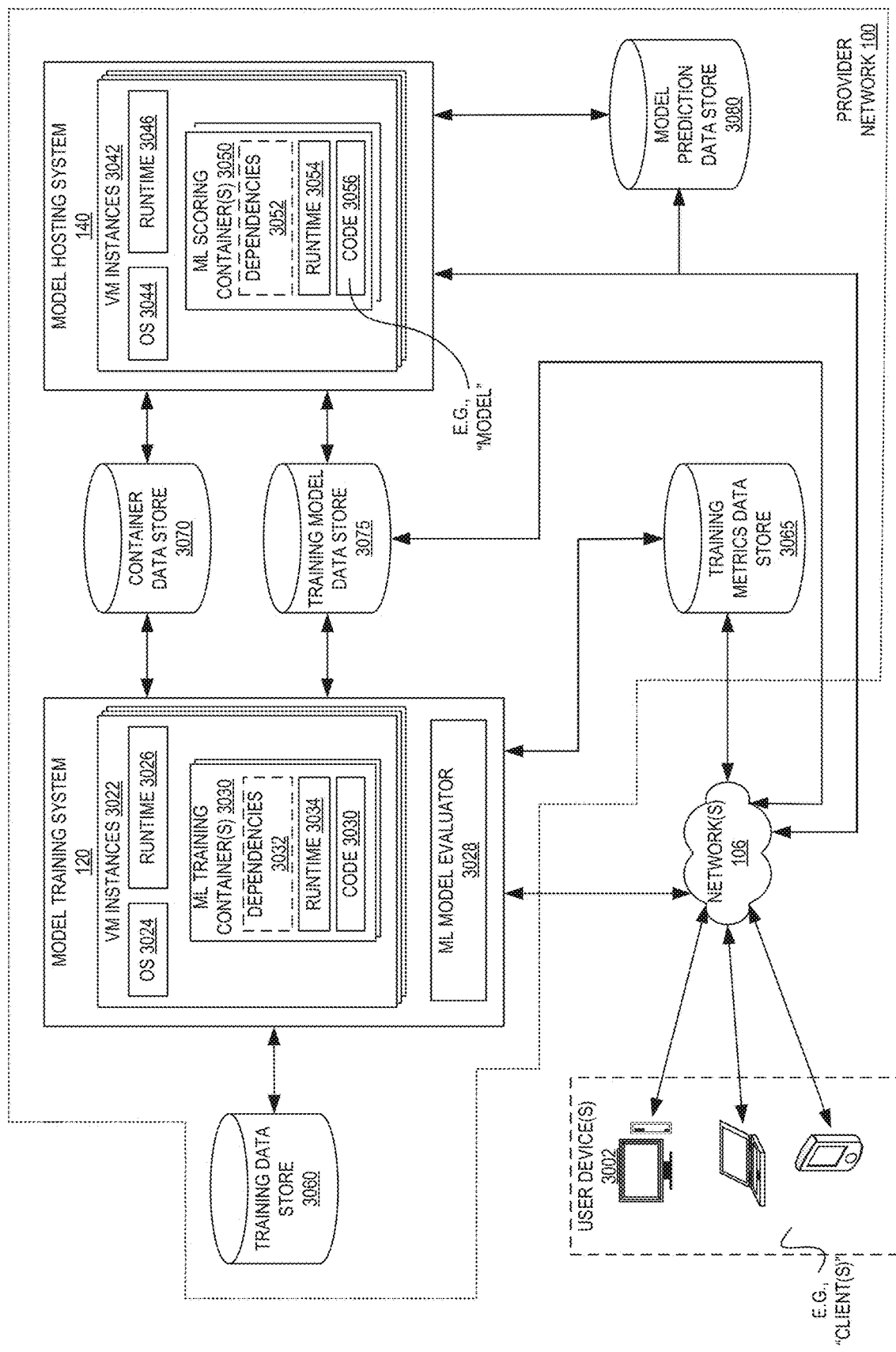
FIG. 30 is a block diagram of an illustrative operating environment in which machine learning models are trained and hosted according to some embodiments.

FIG. 30 is a block diagram of an illustrative operating environment in which machine learning models are trained and hosted according to some embodiments. The operating environment includes end user devices (for example, computing devices(s), edge device(s)), a model training system, a model hosting system, a training data store 3060, a training metrics data store 3065, a container data store 3070, a training model data store 3075, and a model prediction data store 3080.

A machine learning service described herein may include one or more of these entities, such as the model hosting system 140, model training system 120, and so forth.

In some embodiments, users, by way of user devices, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices and the model training system 120 (or provider network 100), and/or between components of the model training system 120 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices can interact with the model training system 120 via frontend 3029 of the model training system 120. For example, a user device can provide a training request to the frontend 3029 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device may provide, in the training request, an algorithm written in any programming language. The model training system 120 then packages the algorithm into a container (optionally with other code, such as a "base" ML algorithm supplemented with user-provided code) that is eventually loaded into a virtual machine instance 3022 for training a machine learning model, as described in greater detail below. For example, a user, via a user device, may develop an algorithm/code using an application (for example, an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device provides, in the training request, an indicator of a container image (for example, an indication of an address or a location at which a container image is stored). For example, the container image can be stored in a container data store 3070, and this container image may have been previously created/uploaded by the user. The model training system 120 can retrieve the container image from the indicated location and create a container using the retrieved container image. The container is then loaded into a virtual machine instance 3022 for training a machine learning model, as described in greater detail below.

The model training system 120 can use the information provided by the user device to train a machine learning model in one or more pre-established virtual machine instances 3022 in some embodiments. In particular, the model training system 120 includes a single physical computing device or multiple physical computing devices that are interconnected using one or more computing networks (not shown), where the physical computing device(s) host one or more virtual machine instances 3022. The model training system 120 can handle the acquisition and configuration of compute capacity (for example, containers, instances, etc., which are described in greater detail below) based on the information describing the computing machine on which to train a machine learning model provided by the user device. The model training system 120 can then train machine learning models using the compute capacity, as is described in greater detail below. The model training system 120 can automatically scale up and down based on the volume of training requests received from user devices via frontend 3029, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 3022 are utilized to execute tasks. For example, such tasks can include training a machine learning model. As shown in FIG. 30, each virtual machine instance 3022 includes an operating system (OS) 3024, a language runtime 3026, and one or more ML training containers 3030. Generally, the ML training containers 3030 are logical units created within a virtual machine instance using the resources available on that instance and can be utilized to isolate execution of a task from other processes (for example, task executions) occurring in the instance. In some embodiments, the ML training containers 3030 are formed from one or more container images and a top container layer. Each container image may further include one or more image layers, where each image layer represents an executable instruction. As described above, some or all of the executable instructions together represent an algorithm that defines a machine learning model. Changes made to the ML training containers 3030 (for example, creation of new files, modification of existing files, deletion of files, etc.) are stored in the top container layer. If a ML training container 3030 is deleted, the top container layer is also deleted. However, the container image(s) that form a portion of the deleted ML training container 3030 can remain unchanged. The ML training containers 3030 can be implemented, for example, as Linux containers (LXC), Docker containers, and the like.

The ML training containers 3030 may include individual a runtime 3034, code 30330, and dependencies 3032 needed by the code 30330 in some embodiments. The runtime 3034 can be defined by one or more executable instructions that form at least a portion of a container image that is used to form the ML training container 3030 (for example, the executable instruction(s) in the container image that define the operating system and/or runtime to run in the container formed from the container image). The code 30330 includes one or more executable instructions that form at least a portion of a container image that is used to form the ML training container 3030. For example, the code 30330 includes the executable instructions in the container image that represent an algorithm that defines a machine learning model, which may reference (or utilize) code or libraries from dependencies 3032. The runtime 3034 is configured to execute the code 30330 in response to an instruction to begin machine learning model training Execution of the code 30330 results in the generation of model data, as described in greater detail below.

In some embodiments, the code 30330 includes executable instructions that represent algorithms that define different machine learning models. For example, the code 30330 includes one set of executable instructions that represent a first algorithm that defines a first machine learning model and a second set of executable instructions that represent a second algorithm that defines a second machine learning model. In some embodiments, the virtual machine instance 3022 executes the code 30330 and trains all of the machine learning models. In some embodiments, the virtual machine instance 3022 executes the code 30330, selecting one of the machine learning models to train. For example, the virtual machine instance 3022 can identify a type of training data indicated by the training request and select a machine learning model to train (for example, execute the executable instructions that represent an algorithm that defines the selected machine learning model) that corresponds with the identified type of training data.

In some embodiments, the runtime 3034 is the same as the runtime 3026 utilized by the virtual machine instance 3022. In some embodiments, the runtime 3034 is different than the runtime 3026 utilized by the virtual machine instance 3022.

In some embodiments, the model training system 120 uses one or more container images included in a training request (or a container image retrieved from the container data store 3070 in response to a received training request) to create and initialize a ML training container 3030 in a virtual machine instance 3022. For example, the model training system 120 creates a ML training container 3030 that includes the container image(s) and/or a top container layer.

Prior to beginning the training process, in some embodiments, the model training system 120 retrieves training data from the location indicated in the training request. For example, the location indicated in the training request can be a location in the training data store 3060. Thus, the model training system 120 retrieves the training data from the indicated location in the training data store 3060. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 3022 training the machine learning model. Once the virtual machine instance 3022 has applied and used the retrieved portion or once the virtual machine instance 3022 is about to use all of the retrieved portion (for example, a buffer storing the retrieved portion is nearly empty), then the model training system 120 can retrieve a second portion of the training data and provide the second retrieved portion to the virtual machine instance 3022, and so on.

To perform the machine learning model training, the virtual machine instance 3022 executes code 30330 stored in the ML training container 3030 in some embodiments. For example, the code 30330 includes some or all of the executable instructions that form the container image of the ML training container 3030 initialized therein. Thus, the virtual machine instance 3022 executes some or all of the executable instructions that form the container image of the ML training container 3030 initialized therein to train a machine learning model. The virtual machine instance 3022 executes some or all of the executable instructions according to the hyperparameter values included in the training request. As an illustrative example, the virtual machine instance 3022 trains a machine learning model by identifying values for certain parameters (for example, coefficients, weights, centroids, etc.). The identified values depend on hyperparameters that define how the training is performed. Thus, the virtual machine instance 3022 can execute the executable instructions to initiate a machine learning model training process, where the training process is run using the hyperparameter values included in the training request. Execution of the executable instructions can include the virtual machine instance 3022 applying the training data retrieved by the model training system 120 as input parameters to some or all of the instructions being executed.

In some embodiments, executing the executable instructions causes the virtual machine instance 3022 (for example, the ML training container 3030) to generate model data. For example, the ML training container 3030 generates model data and stores the model data in a file system of the ML training container 3030. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 3030 such that the model data is written to the top container layer of the ML training container 3030 and/or the container image(s) that forms a portion of the ML training container 3030 is modified to include the model data.

The virtual machine instance 3022 (or the model training system 120 itself) pulls the generated model data from the ML training container 3030 and stores the generated model data in the training model data store 3075 in an entry associated with the virtual machine instance 3022 and/or the machine learning model being trained. In some embodiments, the virtual machine instance 3022 generates a single file that includes model data and stores the single file in the training model data store 3075. In some embodiments, the virtual machine instance 3022 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 3022 can package the multiple files into a single file once training is complete and store the single file in the training model data store 3075. Alternatively, the virtual machine instance 3022 stores the multiple files in the training model data store 3075. The virtual machine instance 3022 stores the file(s) in the training model data store 3075 while the training process is ongoing and/or after the training process is complete.

In some embodiments, the virtual machine instance 3022 regularly stores model data file(s) in the training model data store 3075 as the training process is ongoing. Thus, model data file(s) can be stored in the training model data store 3075 at different times during the training process. Each set of model data files corresponding to a particular time or each set of model data files present in the training model data store 3075 as of a particular time could be checkpoints that represent different versions of a partially-trained machine learning model during different stages of the training process. Accordingly, before training is complete, a user, via the user device can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 3075.

In some embodiments, a virtual machine instance 3022 executes code 30330 stored in a plurality of ML training containers 3030. For example, the algorithm included in the container image can be in a format that allows for the parallelization of the training process. Thus, the model training system 120 can create multiple copies of the container image provided in a training request and cause the virtual machine instance 3022 to load each container image copy in a separate ML training container 3030. The virtual machine instance 3022 can then execute, in parallel, the code 30330 stored in the ML training containers 3030. The virtual machine instance 3022 can further provide configuration information to each ML training container 3030 (for example, information indicating that N ML training containers 3030 are collectively training a machine learning model and that a particular ML training container 3030 receiving the configuration information is ML training container 3030 number X of N), which can be included in the resulting model data. By parallelizing the training process, the model training system 120 can significantly reduce the training time in some embodiments.

In some embodiments, a plurality of virtual machine instances 3022 execute code 30330 stored in a plurality of ML training containers 3030. For example, the resources used to train a particular machine learning model can exceed the limitations of a single virtual machine instance 3022. However, the algorithm included in the container image can be in a format that allows for the parallelization of the training process. Thus, the model training system 120 can create multiple copies of the container image provided in a training request, initialize multiple virtual machine instances 3022, and cause each virtual machine instance 3022 to load a container image copy in one or more separate ML training containers 3030. The virtual machine instances 3022 can then each execute the code 30330 stored in the ML training containers 3030 in parallel. The model training system 120 can further provide configuration information to each ML training container 3030 via the virtual machine instances 3022 (for example, information indicating that N ML training containers 3030 are collectively training a machine learning model and that a particular ML training container 3030 receiving the configuration information is ML training container 3030 number X of N, information indicating that M virtual machine instances 3022 are collectively training a machine learning model and that a particular ML training container 3030 receiving the configuration information is initialized in virtual machine instance 3022 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 3022 that execute the code 30330. Thus, the parallelization can occur over different physical computing devices in addition to over different virtual machine instances 3022 and/or ML training containers 3030.

In some embodiments, the model training system 120 includes a ML model evaluator 3028. The ML model evaluator 3028 can monitor virtual machine instances 3022 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 3028 can obtain the model data for a machine learning model being trained and evaluation data from the training data store 3060. The evaluation data is separate from the data used to train a machine learning model and includes both input data and expected outputs (for example, known results), and thus the ML model evaluator 3028 can define a machine learning model using the model data and execute the machine learning model by providing the input data as inputs to the machine learning model. The ML model evaluator 3028 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 3028 periodically generates model metrics during the training process and stores the model metrics in the training metrics data store 3065 in some embodiments. While the machine learning model is being trained, a user, via the user device, can access and retrieve the model metrics from the training metrics data store 3065. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 3022 to optionally delete an existing ML training container 3030, create and initialize a new ML training container 3030 using some or all of the information included in the request, and execute the code stored in the new ML training container 3030 to restart the machine learning model training process. As another example, the model training system 120 can cause the virtual machine instance 3022 to modify the execution of code stored in an existing ML training container 3030 according to the data provided in the modification request. In some embodiments, the user, via the user device, can transmit a request to the model training system 120 to stop the machine learning model training process. The model training system 120 can then instruct the virtual machine instance 3022 to delete the ML training container 3030 and/or to delete any model data stored in the training model data store 3075.

As described below, in some embodiments, the model data stored in the training model data store 3075 is used by the model hosting system 140 to deploy machine learning models. Alternatively or additionally, a user device or another computing device (not shown) can retrieve the model data from the training model data store 3075 to implement a learning algorithm in an external device. As an illustrative example, a robotic device can include sensors to capture input data. A user device can retrieve the model data from the training model data store 3075 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 3022 are shown in FIG. 30 as a single grouping of virtual machine instances 3022, some embodiments of the present application separate virtual machine instances 3022 that are actively assigned to execute tasks from those virtual machine instances 3022 that are not actively assigned to execute tasks. For example, those virtual machine instances 3022 actively assigned to execute tasks are grouped into an "active pool," while those virtual machine instances 3022 not actively assigned to execute tasks are placed within a "warming pool." In some embodiments, those virtual machine instances 3022 within the warming pool can be pre-initialized with an operating system, language runtimes, and/or other software required to enable rapid execution of tasks (for example, rapid initialization of machine learning model training in ML training container(s) 3030) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices, the model hosting system 140, etc.). The processing unit can also communicate to and from a memory of a virtual machine instance 3022 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 3042. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices via frontend 3049 of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 3042 are utilized to execute tasks. For example, such tasks can include executing a machine learning model. As shown in FIG. 30, each virtual machine instance 3042 includes an operating system (OS) 3044, a language runtime 3046, and one or more ML scoring containers 3050. The ML scoring containers 3050 are similar to the ML training containers 3030 in that the ML scoring containers 3050 are logical units created within a virtual machine instance using the resources available on that instance and can be utilized to isolate execution of a task from other processes (for example, task executions) occurring in the instance. In some embodiments, the ML scoring containers 3050 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 3050 (for example, creation of new files, modification of existing files, deletion of files, etc.) are stored in the top container layer. If a ML scoring container 3050 is deleted, the top container layer is also deleted. However, the container image(s) that form a portion of the deleted ML scoring container 3050 can remain unchanged. The ML scoring containers 3050 can be implemented, for example, as Linux containers.

The ML scoring containers 3050 each include a runtime 3054, code 3056, and dependencies 3052 (for example, supporting software such as libraries) needed by the code 3056 in some embodiments. The runtime 3054 can be defined by one or more executable instructions that form at least a portion of a container image that is used to form the ML scoring container 3050 (for example, the executable instruction(s) in the container image that define the operating system and/or runtime to run in the container formed from the container image). The code 3056 includes one or more executable instructions that form at least a portion of a container image that is used to form the ML scoring container 3050. For example, the code 3056 includes the executable instructions in the container image that represent an algorithm that defines a machine learning model, which may reference dependencies 3052. The code 3056 can also include model data that represent characteristics of the defined machine learning model, as described in greater detail below. The runtime 3054 is configured to execute the code 3056 in response to an instruction to begin execution of a machine learning model. Execution of the code 3056 results in the generation of outputs (for example, predicted results), as described in greater detail below.

In some embodiments, the runtime 3054 is the same as the runtime 3046 utilized by the virtual machine instance 3042.

In some embodiments, runtime 3054 is different than the runtime 3046 utilized by the virtual machine instance 3042.

In some embodiments, the model hosting system 140 uses one or more container images included in a deployment request (or a container image retrieved from the container data store 3070 in response to a received deployment request) to create and initialize a ML scoring container 3050 in a virtual machine instance 3042. For example, the model hosting system 140 creates a ML scoring container 3050 that includes the container image(s) and/or a top container layer.

As described above, a user device can submit a deployment request and/or an execution request to the model hosting system 140 via the frontend 3049 in some embodiments. A deployment request causes the model hosting system 140 to deploy a trained machine learning model into a virtual machine instance 3042. For example, the deployment request can include an identification of an endpoint (for example, an endpoint name, such as an HTTP endpoint name) and an identification of one or more trained machine learning models (for example, a location of one or more model data files stored in the training model data store 3075). Optionally, the deployment request also includes an identification of one or more container images stored in the container data store 3070.

Upon receiving the deployment request, the model hosting system 140 initializes ones or more ML scoring containers 3050 in one or more hosted virtual machine instance 3042. In embodiments in which the deployment request includes an identification of one or more container images, the model hosting system 140 forms the ML scoring container(s) 3050 from the identified container image(s). For example, a container image identified in a deployment request can be the same container image used to form an ML training container 3030 used to train the machine learning model corresponding to the deployment request. Thus, the code 3056 of the ML scoring container(s) 3050 includes one or more executable instructions in the container image(s) that represent an algorithm that defines a machine learning model. In embodiments in which the deployment request does not include an identification of a container image, the model hosting system 140 forms the ML scoring container(s) 3050 from one or more container images stored in the container data store 3070 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 3050 by retrieving model data corresponding to the identified trained machine learning model(s) in some embodiments. For example, the deployment request can identify a location of model data file(s) stored in the training model data store 3075. In embodiments in which a single model data file is identified in the deployment request, the model hosting system 140 retrieves the identified model data file from the training model data store 3075 and inserts the model data file into a single ML scoring container 3050, which forms a portion of code 3056. In some embodiments, the model data file is archived or compressed (for example, formed from a package of individual files). Thus, the model hosting system 140 unarchives or decompresses the model data file to obtain multiple individual files and inserts the individual files into the ML scoring container 3050. In some embodiments, the model hosting system 140 stores the model data file in the same location as the location in which the model data file was stored in the ML training container 3030 that generated the model data file. For example, the model data file initially was stored in the top container layer of the ML training container 3030 at a certain offset, and the model hosting system 140 then stores the model data file in the top container layer of the ML scoring container 3050 at the same offset.

In embodiments in which multiple model data files are identified in the deployment request, the model hosting system 140 retrieves the identified model data files from the training model data store 3075. The model hosting system 140 can insert the model data files into the same ML scoring container 3050, into different ML scoring containers 3050 initialized in the same virtual machine instance 3042, or into different ML scoring containers 3050 initialized in different virtual machine instances 3042. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 3050 with the endpoint identified in the deployment request. For example, each of the initialized ML scoring container(s) 3050 can be associated with a network address. The model hosting system 140 can map the network address(es) to the identified endpoint, and the model hosting system 140 or another system (for example, a routing system, not shown) can store the mapping. Thus, a user device can refer to trained machine learning model(s) stored in the ML scoring container(s) 3050 using the endpoint. This allows for the network address of an ML scoring container 3050 to change without causing the user operating the user device to change the way in which the user refers to a trained machine learning model.

Once the ML scoring container(s) 3050 are initialized, the ML scoring container(s) 3050 are ready to execute trained machine learning model(s). In some embodiments, the user device transmits an execution request to the model hosting system 140 via the frontend 3049, where the execution request identifies an endpoint and includes an input to a machine learning model (for example, a set of input data). The model hosting system 140 or another system (for example, a routing system, not shown) can obtain the execution request, identify the ML scoring container(s) 3050 corresponding to the identified endpoint, and route the input to the identified ML scoring container(s) 3050.

In some embodiments, a virtual machine instance 3042 executes the code 3056 stored in an identified ML scoring container 3050 in response to the model hosting system 140 receiving the execution request. In particular, execution of the code 3056 causes the executable instructions in the code 3056 corresponding to the algorithm to read the model data file stored in the ML scoring container 3050, use the input included in the execution request as an input parameter, and generate a corresponding output. As an illustrative example, the algorithm can include coefficients, weights, layers, cluster centroids, and/or the like. The executable instructions in the code 3056 corresponding to the algorithm can read the model data file to determine values for the coefficients, weights, layers, cluster centroids, and/or the like. The executable instructions can include input parameters, and the input included in the execution request can be supplied by the virtual machine instance 3042 as the input parameters. With the machine learning model characteristics and the input parameters provided, execution of the executable instructions by the virtual machine instance 3042 can be completed, resulting in an output.

In some embodiments, the virtual machine instance 3042 stores the output in the model prediction data store 3080. Alternatively or in addition, the virtual machine instance 3042 transmits the output to the user device that submitted the execution result via the frontend 3049.

In some embodiments, the execution request corresponds to a group of related trained machine learning models. Thus, the ML scoring container 3050 can transmit the output to a second ML scoring container 3050 initialized in the same virtual machine instance 3042 or in a different virtual machine instance 3042. The virtual machine instance 3042 that initialized the second ML scoring container 3050 can then execute second code 3056 stored in the second ML scoring container 3050, providing the received output as an input parameter to the executable instructions in the second code 3056. The second ML scoring container 3050 further includes a model data file stored therein, which is read by the executable instructions in the second code 3056 to determine values for the characteristics defining the machine learning model. Execution of the second code 3056 results in a second output. The virtual machine instance 3042 that initialized the second ML scoring container 3050 can then transmit the second output to the model prediction data store 3080 and/or the user device via the frontend 3049 (for example, if no more trained machine learning models are needed to generate an output) or transmit the second output to a third ML scoring container 3050 initialized in the same or different virtual machine instance 3042 (for example, if outputs from one or more additional trained machine learning models are needed), and the above-referenced process can be repeated with respect to the third ML scoring container 3050.

While the virtual machine instances 3042 are shown in FIG. 30 as a single grouping of virtual machine instances 3042, some embodiments of the present application separate virtual machine instances 3042 that are actively assigned to execute tasks from those virtual machine instances 3042 that are not actively assigned to execute tasks. For example, those virtual machine instances 3042 actively assigned to execute tasks are grouped into an "active pool," while those virtual machine instances 3042 not actively assigned to execute tasks are placed within a "warming pool." In some embodiments, those virtual machine instances 3042 within the warming pool can be pre-initialized with an operating system, language runtimes, and/or other software required to enable rapid execution of tasks (for example, rapid initialization of ML scoring container(s) 3050, rapid execution of code 3056 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices, the model training system 120, etc.). The processing unit can also communicate to and from a memory of a virtual machine instance 3042 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 30 are not meant to be limiting. For example, the model training system 120 and/or the model hosting system 140 could also operate within a computing environment having a fewer or greater number of devices than are illustrated in FIG. 30. Thus, the depiction of the model training system 120 and/or the model hosting system 140 in FIG. 30 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 3029 processes all training requests received from user devices and provisions virtual machine instances 3022. In some embodiments, the frontend 3029 serves as a front door to all the other services provided by the model training system 120. The frontend 3029 processes the requests and makes sure that the requests are properly authorized. For example, the frontend 3029 may determine whether the user associated with the training request is authorized to initiate the training process.

Similarly, frontend 3049 processes all deployment and execution requests received from user devices and provisions virtual machine instances 3042. In some embodiments, the frontend 3049 serves as a front door to all the other services provided by the model hosting system 140. The frontend 3049 processes the requests and makes sure that the requests are properly authorized. For example, the frontend 3049 may determine whether the user associated with a deployment request or an execution request is authorized to access the indicated model data and/or to execute the indicated machine learning model.

The training data store 3060 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 3060 is depicted as being located external to the model training system 120 and the model hosting system 140, this is not meant to be limiting. For example, in some embodiments not shown, the training data store 3060 is located internal to at least one of the model training system 120 or the model hosting system 140.

In some embodiments, the training metrics data store 3065 stores model metrics. While the training metrics data store 3065 is depicted as being located external to the model training system 120 and the model hosting system 140, this is not meant to be limiting. For example, in some embodiments not shown, the training metrics data store 3065 is located internal to at least one of the model training system 120 or the model hosting system 140.

The container data store 3070 stores container images, such as container images used to form ML training containers 3030 and/or ML scoring containers 3050, that can be retrieved by various virtual machine instances 3022 and/or 3042. While the container data store 3070 is depicted as being located external to the model training system 120 and the model hosting system 140, this is not meant to be limiting. For example, in some embodiments not shown, the container data store 3070 is located internal to at least one of the model training system 120 and the model hosting system 140.

The training model data store 3075 stores model data files. In some embodiments, some of the model data files are comprised of a single file, while other model data files are packages of multiple individual files. While the training model data store 3075 is depicted as being located external to the model training system 120 and the model hosting system 140, this is not meant to be limiting. For example, in some embodiments not shown, the training model data store 3075 is located internal to at least one of the model training system 120 or the model hosting system 140.

The model prediction data store 3080 stores outputs (for example, execution results) generated by the ML scoring containers 3050 in some embodiments. While the model prediction data store 3080 is depicted as being located external to the model training system 120 and the model hosting system 140, this is not meant to be limiting. For example, in some embodiments not shown, the model prediction data store 3080 is located internal to at least one of the model training system 120 and the model hosting system 140.

While the model training system 120, the model hosting system 140, the training data store 3060, the training metrics data store 3065, the container data store 3070, the training model data store 3075, and the model prediction data store 3080 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices via the one or more network(s) 106.

Various example user devices are shown in FIG. 30, including a desktop computer, laptop, and a mobile phone, each provided by way of illustration. In general, the user devices can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices with one or more user interfaces, command-line interfaces (CLI), application programing interfaces (API), and/or other programmatic interfaces for submitting training requests, deployment requests, and/or execution requests. In some embodiments, the user devices can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to create a training dataset from at least one image, the request including an indication of the at least one image and at least one indication of an operation to perform on the at least one image to generate a plurality of images from the at least one image;
creating the training dataset of images by extracting one or more chunks from a first image of the at least one image according to the request by performing one or more of:
extracting identically sized, non-overlapping chunks from the first image of the at least one image,
extracting non-identically sized chunks from the first image of the at least one image,
extracting any identified region of interest as a chunk from the first image of the at least one image, or
performing object detection on the first image of the at least one image and extracting any detected object of interest as a chunk; and
receiving one or more requests to train an anomaly detection machine learning model using the training dataset; and
training the anomaly detection machine learning model according to the one or more requests using the training dataset;
performing feedback-based training on the anomaly detection machine learning model by at least:
applying the anomaly detection machine learning model on a set of unlabeled testing data that is different than the training dataset to generate a prediction of whether the unlabeled testing data is anomalous,
receiving feedback on the prediction, wherein the feedback includes an indication of a veracity of the prediction,
generating an updated training dataset by updating the training dataset to include a label for correctly predicted data of the unlabeled testing data based on the feedback, and
retraining the anomaly detection machine learning model using the updated training dataset.

2. The computer-implemented method of claim 1, wherein the region of interest is provided via a graphical user interface on an image from a same source as the at least one image.

3. The computer-implemented method of claim 2, wherein the image from the same source is a wide-angled image.

4. A computer-implemented method comprising:
receiving a request to create a training dataset from at least one image, the request including an indication of the at least one image and at least one indication of an operation to perform on the at least one image to generate a plurality of images from the at least one image;
creating the training dataset by extracting one or more chunks from a first image of the at least one image according to the request;
receiving one or more requests to train an anomaly detection machine learning model using the training dataset;
training the anomaly detection machine learning model according to the one or more requests using the training dataset; and
performing feedback-based training on the anomaly detection machine learning model by at least:
applying the anomaly detection machine learning model on a set of unlabeled testing data that is different than the training dataset to generate a prediction of whether the unlabeled testing data is anomalous,
receiving feedback on the prediction, wherein the feedback includes an indication of a veracity of the prediction,
generating an updated training dataset by updating the training dataset to include a label for correctly predicted data of the unlabeled testing data based on the feedback, and
retraining the anomaly detection machine learning model using the updated training dataset.

5. The computer-implemented method of claim 4, further comprising:
performing object detection on the at least one image to detect an object indicated in the request, wherein the object detection is performed by a machine learning model on the one or more chunks including the object.

6. The computer-implemented method of claim 4, wherein a region of interest to extract is provided via a graphical user interface on an image from a same source as the at least one image.

7. The computer-implemented method of claim 6, wherein the image from the same source is a wide-angled image.

8. The computer-implemented method of claim 4, further comprising:
performing inferences on unlabeled images using the anomaly detection machine learning model, wherein the unlabeled images are subjected to a same extracting of one or more chunks as the first image of the at least one image.

9. The computer-implemented method of claim 4, further comprising:
creating a testing dataset by extracting one or more chunks from a second at least one image, different than the first image of the at least one image, by performing one or more of:
extracting identically sized, non-overlapping chunks from the second at least one image,
extracting non-identically sized from the second at least one image,
extracting any identified region of interest as a chunk from the second at least one image, or
performing object detection on the second at least one image and extracting any detected object of interest as a chunk.

10. The computer-implemented method of claim 9, wherein which of the extracting identically sized, non-overlapping chunks from the second at least one image, extracting non-identically sized from the second at least one image, extracting any identified region of interest as a chunk from the second at least one image, and performing object detection on the second at least one image and extracting any detected object of interest as a chunk is to be performed is set by a request.

11. The computer-implemented method of claim 4, further comprising:
pre-processing the first image of the at least one image by performing one or more of at least one geometric transformation, at least one photometric transformation, or normalization.

12. The computer-implemented method of claim 4, further comprising
post-processing the one or more chunks by performing one or more of at least one geometric transformation, at least one photometric transformation, or normalization.

13. The computer-implemented method of claim 12, wherein the normalization is to make each chunk consistent with training images of a different size.

14. The computer-implemented method of claim 4, wherein the first image of the at least one image is an image produced from one of a still camera, a video camera, or an x-ray machine.

15. A system comprising:
a first one or more electronic devices to implement a data storage service in a multi-tenant provider network; and
a second one or more electronic devices to implement a dataset generation service in the multi-tenant provider network, the dataset generation service including instructions that upon execution cause the dataset generation service to:
receive a request to create a training dataset from at least one image, the request including an indication of the at least one image and at least one indication of an operation to perform on the at least one image to generate a plurality of images from the at least one image;
create the training dataset by extracting one or more chunks from a first image of the at least one image according to the request;
receive one or more requests to train an anomaly detection machine learning model using the training dataset;
train the anomaly detection machine learning model according to the one or more requests using the training dataset; and
perform feedback-based training on the anomaly detection machine learning model by at least:
applying the anomaly detection machine learning model on a set of unlabeled testing data that is different than the training dataset to generate a prediction of whether the unlabeled testing data is anomalous,
receiving feedback on the prediction, wherein the feedback includes an indication of a veracity of the prediction,
generating an updated training dataset by updating the training dataset to include a label for correctly predicted data of the unlabeled testing data based on the feedback, and
retraining the anomaly detection machine learning model using the updated training dataset.

16. The system of claim 14, wherein the dataset generation service is a subset of an anomaly detection service.

17. The system of claim 14, wherein a region of interest to extract is provided via a graphical user interface on an image from a same source as the at least one image.

18. The system of claim 17, wherein the image from the same source is a wide-angled image.

19. The system of claim 14, wherein the dataset generation service includes further instructions that upon execution further cause the dataset generation service to post-process the extracted chunks by performing one or more of at least one geometric transformation, at least one photometric transformation, or normalization.

20. The system of claim 19, wherein the normalization is to make each chunk consistent with training images of a different size.

* * * * *